United States Patent
Ichikawa

(10) Patent No.: US 8,816,537 B2
(45) Date of Patent: Aug. 26, 2014

(54) CONTACTLESS ELECTRIC POWER RECEIVING APPARATUS, CONTACTLESS ELECTRIC POWER TRANSMITTING APPARATUS, CONTACTLESS ELECTRIC POWER FEEDING SYSTEM, AND VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 126 days.

(21) Appl. No.: 13/521,368

(22) PCT Filed: Jan. 18, 2010

(86) PCT No.: PCT/JP2010/050471
§ 371 (c)(1),
(2), (4) Date: Jul. 10, 2012

(87) PCT Pub. No.: WO2011/086694
PCT Pub. Date: Jul. 21, 2011

(65) Prior Publication Data
US 2013/0119774 A1 May 16, 2013

(51) Int. Cl.
*H01F 27/42* (2006.01)
*H01F 37/00* (2006.01)
*H01F 38/00* (2006.01)
*B60L 11/14* (2006.01)
*H02J 7/02* (2006.01)
*B60L 11/12* (2006.01)
*H04B 5/00* (2006.01)
*B60L 11/18* (2006.01)

(52) U.S. Cl.
CPC ........... *H04B 5/0037* (2013.01); *Y02T 10/7022* (2013.01); *Y02T 90/14* (2013.01); *B60L 11/14* (2013.01); *Y02T 10/7005* (2013.01); *H02J 7/025* (2013.01); *Y02T 90/122* (2013.01); *B60L 11/123* (2013.01); *Y02T 90/128* (2013.01); *Y02T 10/7077* (2013.01); *Y02T 10/6217* (2013.01); *B60L 11/1838* (2013.01); *B60L 2220/14* (2013.01); *Y02T 10/7088* (2013.01); *Y02T 90/163* (2013.01); *B60L 11/182* (2013.01)
USPC ........................... 307/104; 320/108; 320/109

(58) Field of Classification Search
CPC ................................. H02J 1/00; H04B 5/0037
USPC .......................................................... 307/104
See application file for complete search history.

(56) References Cited

U.S. PATENT DOCUMENTS

| 5,592,367 A | 1/1997 | Sugimori et al. |
| 7,741,734 B2 | 6/2010 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Rexford Barnie
*Assistant Examiner* — Toan Vu
(74) *Attorney, Agent, or Firm* — Oliff PLC

(57) ABSTRACT

In a contactless power feeding system using a resonance method, an electric power receiving apparatus or an electric power transmitting apparatus is connected to a self-resonant coil and includes a capacitor having a variable capacitance. When electromagnetic resonance occurs at a prescribed frequency determined by the electric power transmitting apparatus, the capacitance of the capacitor is adjusted so as to maximize the electric power transmission efficiency during electric power feeding. Accordingly, deterioration in transmission efficiency can be suppressed even when the distance between the secondary self-resonant coil included in the electric power receiving apparatus and the primary self-resonant coil included in the electric power transmitting apparatus changes from a reference distance at the time of design.

12 Claims, 15 Drawing Sheets

(56) References Cited

U.S. PATENT DOCUMENTS

| | | |
|---|---|---|
| 8,008,888 B2 | 8/2011 | Oyobe et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0056098 A1* | 3/2010 | Kanno et al. ............... 455/343.1 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1 | 9/2010 | Oyobe et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0295506 A1 | 11/2010 | Ichikawa |
| 2011/0227421 A1 | 9/2011 | Sakoda et al. |
| 2011/0241440 A1 | 10/2011 | Sakoda et al. |
| 2012/0153738 A1* | 6/2012 | Karalis et al. ............... 307/104 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 068 441 A1 | 6/2009 |
| EP | 2 130 287 A1 | 12/2009 |
| IN | 735/DELNP/2008 | 5/2008 |
| IN | 6195/DELNP/2009 | 7/2010 |
| JP | A-7-337035 | 12/1995 |
| JP | A-8-175232 | 7/1996 |
| JP | A-11-225401 | 8/1999 |
| JP | A-2002-272134 | 9/2002 |
| JP | A-2003-250233 | 9/2003 |
| JP | A-2004-356765 | 12/2004 |
| JP | A-2009-501510 | 1/2009 |
| JP | A-2009-106136 | 5/2009 |
| JP | A-2009-124687 | 6/2009 |
| JP | A-2010-074937 | 4/2010 |
| JP | A-2010-130878 | 6/2010 |
| JP | A-2010-141976 | 6/2010 |
| JP | A-2010-141977 | 6/2010 |
| JP | B1-4856288 | 1/2012 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2009/054221 A1 | 4/2009 |
| WO | WO 2010/032309 A1 | 3/2010 |
| WO | WO 2010/064584 A1 | 6/2010 |
| WO | WO 2010/067763 A1 | 6/2010 |
| WO | WO 2011/142417 A1 | 11/2011 |
| WO | WO 2010/020475 A1 | 2/2012 |

* cited by examiner

CONTACTLESS ELECTRIC POWER RECEIVING APPARATUS, CONTACTLESS ELECTRIC POWER TRANSMITTING APPARATUS, CONTACTLESS ELECTRIC POWER FEEDING SYSTEM, AND VEHICLE

TECHNICAL FIELD

The present invention relates to a contactless electric power receiving apparatus, a contactless electric power transmitting apparatus, a contactless electric power feeding system, and a vehicle, and more specifically to control of a contactless electric power feeding system using a resonance method.

BACKGROUND ART

In recent years, much attention has been given to a vehicle, as an environmentally-friendly vehicle, equipped with a power storage device (for example, a secondary battery, a capacitor and the like) and running with the driving force generated from the electric power stored in the power storage device. Such a vehicle includes, for example, an electric vehicle, a hybrid vehicle, a fuel cell vehicle, and the like.

It is known that some hybrid vehicles have a power storage device mounted on the vehicle and chargeable from an electric power supply external to the vehicle, like the electric vehicles. For example, a so-called "plug-in hybrid vehicle" is known that has a power storage device chargeable from a power supply of an ordinary household by connecting a power supply outlet provided at the house and a charging inlet provided at the vehicle by means of a charging cable.

As for the way to transmit electric power, wireless power transmission without using a power supply cord and a power transmission cable has been of interest in recent years. Three techniques are known as predominant wireless power transmission techniques, namely power transmission by means of electromagnetic induction, power transmission by means of electromagnetic wave and power transmission by means of a resonance method.

Among these techniques, the resonance method is a contactless power transmission technique according to which a pair of resonators (a pair of self-resonant coils, for example) is caused to resonate in an electromagnetic field (near field) and electric power is transmitted through the electromagnetic field. With the resonance method, a large amount of electric power of a few kW can be transmitted over a relatively long distance (a few meters, for example).

Japanese Patent Laying-Open No. 2009-106136 (PTL 1) discloses a technique of receiving charging power wirelessly from a power supply external to the vehicle by the resonance method, and allowing charging of a vehicle-mounted power storage device.

Japanese Patent Laying-Open No. 2004-356765 (PTL 2) discloses a technique by a contactless data carrier including a coil-shaped antenna and a variable capacitor for adjusting a resonance frequency with a contactless reader writer to perform wireless communication.

CITATION LIST

Patent Literature

PTL 1: Japanese Patent Laying-Open No. 2009-106136
PTL 2: Japanese Patent Laying-Open No. 2004-356765

SUMMARY OF INVENTION

Technical Problem

In the contactless electric power feeding system using the resonance method, electromagnetic resonance is caused between the self-resonant coil included in the electric power transmitting apparatus and the self-resonant coil included in the electric power receiving apparatus for transferring electric power therebetween. Accordingly, when the resonance frequency becomes different between the electric power transmitting apparatus and the electric power receiving apparatus, the electric power transmission efficiency may be deteriorated.

Furthermore, when the distance between the electric power transmitting apparatus and the electric power receiving apparatus changes, the space impedance varies, which may also lead to a change in the frequency at which the transmission efficiency is maximized. Therefore, even if the resonance frequencies of the electric power transmitting apparatus and the electric power receiving apparatus are adjusted so as to maximize the transmission efficiency in the state where these apparatuses are spaced apart from each other at a prescribed reference distance, the transmission efficiency may be deteriorated, for example, when the vehicle is stopped at a displaced position.

The present invention has been made to solve the above-described problems. An object of the present invention is to provide a contactless electric power feeding system using a resonance method for suppressing deterioration in the electric power transmission efficiency even when the distance between the electric power transmitting apparatus and the electric power receiving apparatus changes.

Solution to Problem

A contactless electric power receiving apparatus according to the present invention is to receive electric power in a contactless manner with an electric power transmitting apparatus facing thereto. The contactless electric power receiving apparatus includes a self-resonant coil, a capacitor and a controller. The self-resonant coil receives electric power through electromagnetic resonance with the electric power transmitting apparatus. The capacitor is connected to the self-resonant coil and configured to have a variable capacitance for adjusting a resonance frequency of the self-resonant coil. The controller controls the capacitance of the capacitor so as to improve electric power transmission efficiency when electromagnetic resonance occurs at a prescribed frequency determined by the electric power transmitting apparatus.

Preferably, the controller sets the capacitance of the capacitor so as to maximize received electric power received by the self-resonant coil.

Preferably, the capacitor includes a first capacitor having a fixed capacitance and a second capacitor having a variable capacitance and connected to the self-resonant coil in parallel with the first capacitor.

Preferably, the first capacitor is greater in capacitance than the second capacitor.

Preferably, the capacitance of the second capacitor is set such that a capacitance value obtained by subtracting a half of the variable capacitance of the second capacitor from a total capacitance value of the capacitance of the first capacitor and a maximum capacitance of the second capacitor is smaller than a reference capacitance value determined from a target distance between the electric power transmitting apparatus and the contactless electric power receiving apparatus at the prescribed frequency.

A contactless electric power transmitting apparatus according to the present invention is to transmit electric power in a contactless manner with an electric power receiving apparatus facing thereto. The contactless electric power transmitting apparatus includes a self-resonant coil, a capacitor and a controller. The self-resonant coil transmits electric power supplied from a power supply apparatus through electromagnetic resonance with the electric power receiving apparatus. The capacitor is connected to the self-resonant coil and configured to have a variable capacitance for adjusting a resonance frequency of the self-resonant coil. The controller controls the capacitance of the capacitor so as to improve electric power transmission efficiency when electromagnetic resonance occurs at a prescribed frequency determined by the power supply apparatus.

Preferably, the controller sets the capacitance of the capacitor so as to minimize reflected electric power included in transmitted electric power and reflected back without being received by the electric power receiving apparatus.

Preferably, the capacitor includes a first capacitor having a fixed capacitance and a second capacitor having a variable capacitance and connected to the self-resonant coil in parallel with the first capacitor.

Preferably, the first capacitor is greater in capacitance than the second capacitor.

Preferably, the capacitance of the second capacitor is set such that a value obtained by subtracting a half of the variable capacitance of the second capacitor from a total capacitance value of the capacitance of the first capacitor and a maximum capacitance of the second capacitor is smaller than a reference capacitance value determined from a target distance between the electric power receiving apparatus and the contactless electric power transmitting apparatus at the prescribed frequency.

A contactless electric power feeding system according to the present invention is to transfer electric power in a contactless manner between an electric power transmitting apparatus and an electric power receiving apparatus. The electric power transmitting apparatus includes a first self-resonant coil, a first capacitor, and a first controller for controlling the first capacitor. The first self-resonant coil transmits electric power supplied from a power supply apparatus through electromagnetic resonance with the electric power receiving apparatus. The first capacitor is connected to the first self-resonant coil and configured to have a variable capacitance for adjusting a resonance frequency of the first self-resonant coil. The electric power receiving apparatus includes a second self-resonant coil, a second capacitor and a second controller for controlling the second capacitor. The second self-resonant coil receives electric power through electromagnetic resonance with the electric power transmitting apparatus. The second capacitor is connected to the second self-resonant coil and configured to have a variable capacitance for adjusting a resonance frequency of the second self-resonant coil. The first controller and the second controller are configured to be capable of transmitting and receiving a signal to and from each other through communication. The first controller and the second controller control the capacitances of the first capacitor and the second capacitor, respectively, in synchronization with each other so as to improve electric power transmission efficiency when electromagnetic resonance occurs at a prescribed frequency determined by the power supply apparatus.

Preferably, the second controller transmits received electric power received by the electric power receiving apparatus to the first controller. The first controller determines based on the received electric power received from the second controller whether or not the transmission efficiency is maximized.

Preferably, the first controller and the second controller control the first capacitor and the second capacitor, respectively, such that the first capacitor is identical in direction of capacitance change to the second capacitor.

Preferably, the first controller and the second controller cause the capacitance of the first capacitor and the capacitance of the second capacitor, respectively, to be equal to a prescribed initial value, and thereafter, change the capacitance of the first capacitor and the capacitance of the second capacitor, respectively.

A vehicle according to the present invention is provided with a contactless electric power receiving apparatus for receiving electric power in a contactless manner with an electric power transmitting apparatus facing thereto. The contactless electric power receiving apparatus includes a self-resonant coil, a capacitor and a controller. The self-resonant coil receives electric power through electromagnetic resonance with the electric power transmitting apparatus. The capacitor is connected to the self-resonant coil and configured to have a variable capacitance for adjusting a resonance frequency. The controller controls the capacitance of the capacitor so as to improve electric power transmission efficiency when electromagnetic resonance occurs at a prescribed frequency determined by the electric power transmitting apparatus.

Advantageous Effects of Invention

According to the present invention, in the contactless electric power feeding system using a resonance method, deterioration in electric power transmission efficiency can be suppressed even when the distance between the electric power transmitting apparatus and the electric power receiving apparatus changes.

DESCRIPTION OF EMBODIMENTS

Figure 1:
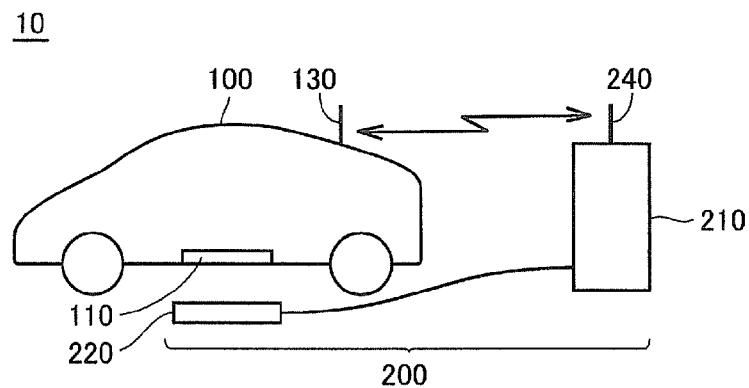
FIG. 1 is an entire configuration diagram of a vehicle power feeding system according to the first embodiment of the present invention.

The embodiments of the present invention will be hereinafter described in detail with reference to the accompanying drawings, in which the same or corresponding components are designated by the same reference characters, and description thereof will not be repeated.

First Embodiment

FIG. 1 is an entire configuration diagram of a vehicle power feeding system 10 according to the first embodiment of the present invention. Referring to FIG. 1, vehicle power feeding system 10 includes a vehicle 100 and a power transmitting apparatus 200. Vehicle 100 includes a power receiving apparatus 110 and a communication unit 130.

Power receiving apparatus 110 is configured to be mounted on the bottom of the vehicle's body and receive electric power in a contactless manner that is transmitted from a power transmitting unit 220 (described later) of power transmitting apparatus 200. Specifically, power receiving apparatus 110 includes a self-resonant coil (described later) resonating through an electromagnetic field with a self-resonant coil included in power transmitting unit 220 to thereby receive electric power in a contactless manner from power transmitting unit 220. Communication unit 130 is a communication interface for communication to be performed between vehicle 100 and power transmitting apparatus 200.

Power transmitting apparatus 200 includes a power supply apparatus 210, a power transmitting unit 220, and a communication unit 240. Power supply apparatus 210 converts AC (alternating-current) electric power supplied for example from a commercial power supply into high-frequency electric power, and outputs the electric power to power transmitting unit 220. The frequency of the high-frequency electric power generated by power supply apparatus 210 is 1 M to ten-odd MHz, for example.

Power transmitting unit 220 is configured to be mounted on the floor of a parking space, and transmit, in a contactless manner, the high-frequency electric power supplied from power supply apparatus 210 to power receiving apparatus 110 of vehicle 100. Specifically, power transmitting unit 220 includes a self-resonant coil (described later) resonating through an electromagnetic field with a self-resonant coil included in power receiving apparatus 110, to thereby transmit electric power in a contactless manner to power receiving apparatus 110. Communication unit 240 is an interface for communication to be performed between power transmitting apparatus 200 and vehicle 100.

In this vehicle power feeding system 10, high-frequency electric power is transmitted from power transmitting unit 220 of power transmitting apparatus 200, and the self-resonant coil included in power receiving apparatus 110 of vehicle 100 and the self-resonant coil included in power transmitting unit 220 resonate through an electromagnetic field, and accordingly, electric power is fed from power transmitting apparatus 200 to vehicle 100.

In the first embodiment, prior to practical and regular electric power feeding, a pre-feeding of electric power (which will be hereinafter also referred to as "test power transmission") is performed from power transmitting unit 220 to power receiving apparatus 110 and, based on the electric power feeding conditions, power receiving apparatus 110 is adjusted so as to maximize the transmission efficiency.

The magnitude of the electric power transmitted from power transmitting unit 220 during the above-described test power transmission is set smaller than the electric power supplied from power transmitting unit 220 to power receiving apparatus 110 in performing practical and regular electric power transmission.

A description will now be given of a contactless power feeding method used for vehicle power feeding system 10 according to the first embodiment. In vehicle power feeding system 10 of the first embodiment, the resonance method is used to feed electric power from power transmitting apparatus 200 to vehicle 100.

Figure 2:
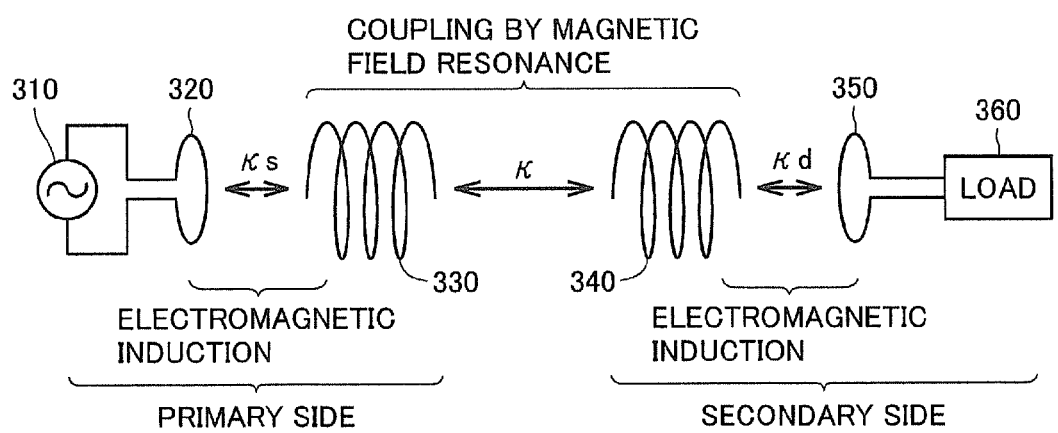
FIG. 2 is a diagram for illustrating a principle of electric power transmission by means of the resonance method.

FIG. 2 is a diagram for illustrating a principle of electric power transmission by means of the resonance method. Referring to FIG. 2, according to this resonance method, two LC resonant coils having the same natural frequency resonate in an electromagnetic field (near field) like two resonating tuning forks, and accordingly, electric power is transmitted through the electromagnetic field from one coil to the other coil.

Specifically, a primary coil 320 that is an electromagnetic induction coil is connected to a high-frequency power supply 310, and high-frequency electric power of 1 M to ten-odd MHz is fed to a primary self-resonant coil 330 magnetically coupled to primary coil 320 by electromagnetic induction. Primary self-resonant coil 330 is an LC resonator having its own inductance and stray capacitance, and resonates with a secondary self-resonant coil 340 having the same natural frequency as primary self-resonant coil 330 through an electromagnetic field (near field). Then, energy (electric power) is transferred from primary self-resonant coil 330 to secondary self-resonant coil 340 through the electromagnetic field. The energy (electric power) transferred to secondary self-resonant coil 340 is picked up by a secondary coil 350 that is an electromagnetic induction coil magnetically coupled to secondary self-resonant coil 340 by electromagnetic induction, and supplied to a load 360. Electric power transmission by means of the resonance method is accomplished when a Q factor representing the intensity of resonance of primary self-resonant coil 330 and secondary self-resonant coil 340 is larger than, for example, 100.

As to the correspondence relationship with FIG. 1, secondary self-resonant coil 340 and secondary coil 350 correspond to power receiving apparatus 110 in FIG. 1, and primary coil 320 and primary self-resonant coil 330 correspond to power transmitting unit 220 in FIG. 1.

Figure 3:
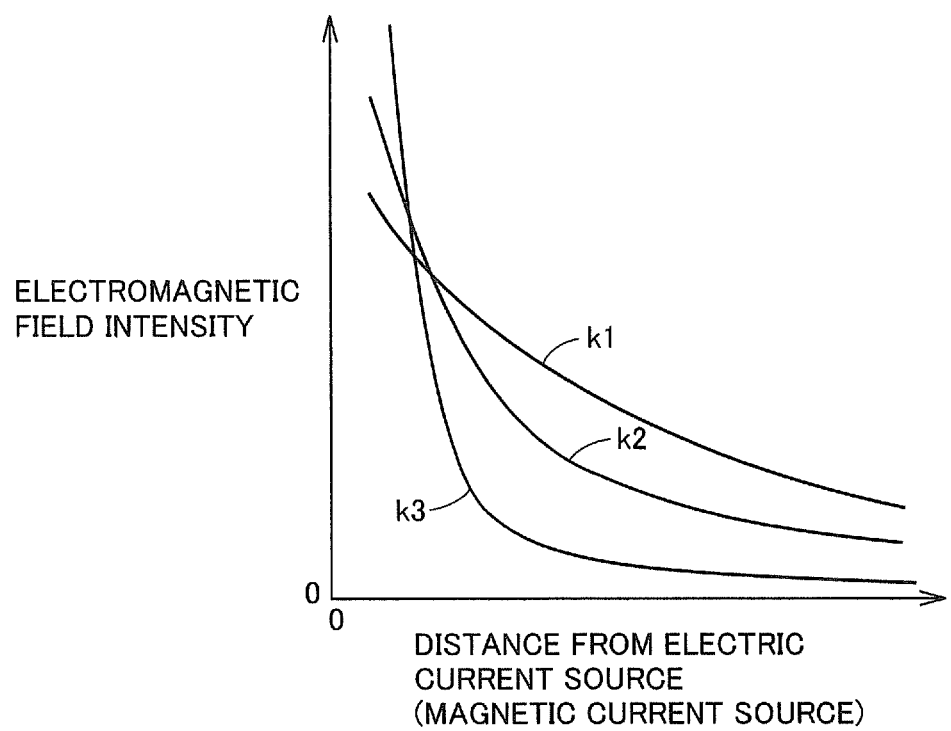
FIG. 3 is a diagram showing the relation between a distance from an electric current source (magnetic current source) and the intensity of an electromagnetic field.

FIG. 3 is a diagram showing a relation between a distance from an electric current source (magnetic current source) and the intensity of an electromagnetic field. Referring to FIG. 3, the electromagnetic field includes three components. Line k1 represents a component inversely proportional to a distance from a wave source, and is referred to as a "radiation electromagnetic field". Line k2 represents a component inversely proportional to the square of a distance from the wave source, and is referred to as an "induction electromagnetic field". Line k3 represents a component inversely proportional to the cube of a distance from the wave source, and is referred to as a "static electromagnetic field".

Here, there is a region where the intensity of the electromagnetic wave sharply decreases with respect to the distance from the wave source. The resonance method uses this near field (evanescent field) to transfer energy (electric power). More specifically, the near field is used to cause a pair of resonators (for example, a pair of LC resonant coils) having the same natural frequency to resonate and thereby transfer energy (electric power) from one resonator (primary self-resonant coil) to the other resonator (secondary self-resonant coil). This near field does not propagate energy (electric power) to a distant location. Therefore, as compared with an electromagnetic wave transferring energy (electric power) by the "radiation electromagnetic field" propagating energy to a distant location, the resonance method can transmit electric power with a relatively small energy loss.

Figure 4:
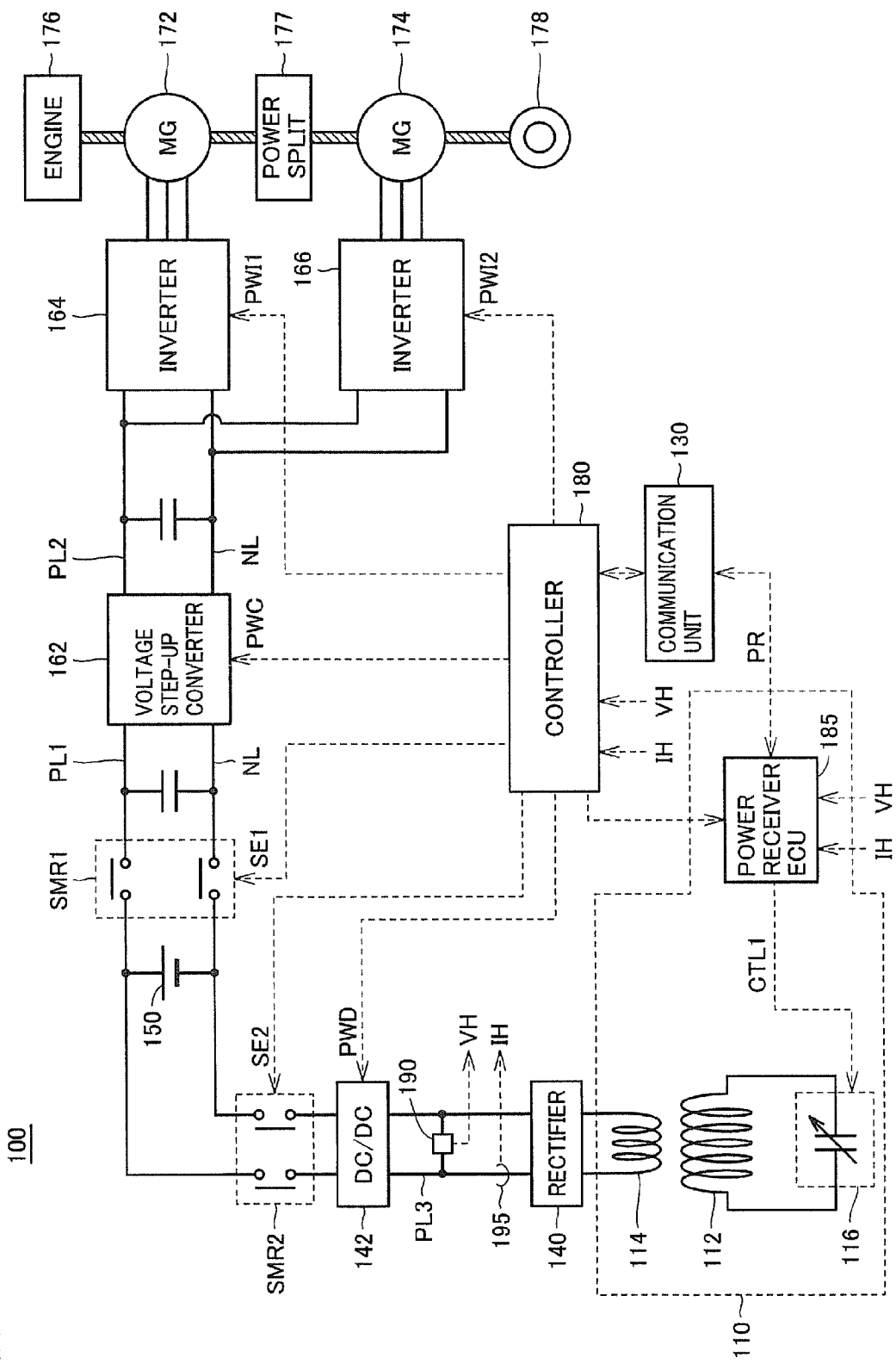
FIG. 4 is a detailed configuration diagram of a vehicle shown in FIG. 1.

FIG. 4 is a detailed configuration diagram of vehicle 100 shown in FIG. 1.

Referring to FIG. 4, vehicle 100 includes a power storage device 150, a system main relay SMR1, a voltage step-up converter 162, inverters 164, 166, motor generators 172, 174, an engine 176, a power split device 177, and a drive wheel 178. Vehicle 100 also includes power receiving apparatus 110, a rectifier 140, a DC/DC converter 142, a system main relay SMR2, a voltage sensor 190, and a current sensor 195. Furthermore, vehicle 100 includes a controller 180 and a communication unit 130. Power receiving apparatus 110 includes secondary self-resonant coil 112, a secondary coil 114, a capacitor 116, and a power receiver ECU (Electronic Control Unit) 185.

While vehicle 100 in the first embodiment is described as a hybrid vehicle including engine 176 by way of example, the configuration of vehicle 100 is not limited thereto. The embodiment is also applicable to any vehicle such as electric vehicle and fuel cell vehicle as long as the vehicle is driven by an electric motor. In this case, engine 176 is not included in the configuration.

This vehicle 100 is mounted with engine 176 and motor generator 174 each used as a driving source. Engine 176 and motor generators 172, 174 are coupled to power split device 177. Vehicle 100 travels using the driving force generated by at least one of engine 176 and motor generator 174. The motive power generated by engine 176 is split into two components by power split device 177. Specifically, one is transmitted through a path leading to drive wheel 178 and the other is transmitted through a path leading to motor generator 172.

Motor generator 172 is an AC rotating electric machine and is specifically a three-phase AC synchronous electric motor, for example, having permanent magnets embedded in a rotor. Motor generator 172 generates electric power using the driving force from engine 176 that has been split by power split device 177. For example, when the charging status (also referred to as "SOC (State Of Charge)") of power storage device 150 becomes lower than a predetermined value, engine 176 starts and motor generator 172 generates electric power. Thus, power storage device 150 is charged.

Motor generator 174 is also an AC rotating electric machine. Like motor generator 172, motor generator 174 is for example a three-phase AC synchronous electric motor having permanent magnets embedded in a rotor. Motor generator 174 uses at least one of the electric power stored in power storage device 150 and the electric power generated by motor generator 172 to generate driving force. The driving force of motor generator 174 is transmitted to drive wheel 178.

When the vehicle's brake is applied or when acceleration is slowed down while the vehicle is traveling downhill, motor generator 174 receives the rotation force from drive wheel 178, and accordingly, operates as an electric generator. Motor generator 174 thus operates as a regenerative brake converting the traveling energy into electric power and generating braking force. The electric power generated by motor generator 174 is stored in power storage device 150.

Power split device 177 is configured to include a planetary gear train including a sun gear, a pinion gear, a carrier, and a ring gear that are not shown. The pinion gear engages with the sun gear and the ring gear. The carrier supports the pinion gear so that the pinion gear can rotate about its axis, and is coupled to a crankshaft of engine 176. The sun gear is coupled to a rotational shaft of motor generator 172. The ring gear is coupled to a rotational shaft of motor generator 174 and drive wheel 178.

Power storage device 150 is a rechargeable DC power supply and is configured to include a secondary battery such as lithium-ion battery or nickel-metal hydride battery, for example. Power storage device 150 stores electric power supplied from DC/DC converter 142. Power storage device 150 also stores regenerative electric power generated by motor generators 172, 174. Power storage device 150 supplies the stored electric power to voltage step-up converter 162. As power storage device 150, a capacitor of large capacitance may be employed. The power storage device may be any as long as the power storage device is an electric power buffer capable of temporarily storing the electric power supplied from power transmitting apparatus 200 (FIG. 1) and the regenerative electric power from motor generators 172, 174, and supplying the stored electric power to voltage step-up converter 162.

System main relay SMR1 is provided in each of a power line PL and a ground line NL between power storage device 150 and voltage step-up converter 162. When control signal SE1 from controller 180 is activated, system main relay SMR1 electrically connects power storage device 150 and voltage step-up converter 162. When control signal SE1 is deactivated, system main relay SMR1 breaks the electrical path between power storage device 150 and voltage step-up converter 162. Based on a signal PWC from controller 180, voltage step-up converter 162 steps up a voltage so that the voltage on a power line PL2 is equal to or larger than the voltage that is output from power storage device 150. Voltage step-up converter 162 is configured to include a DC chopper circuit, for example. Inverters 164, 166 are provided in association with motor generators 172, 174, respectively. Inverter 164 drives motor generator 172 based on a signal PWI1 from controller 180, while inverter 166 drives motor generator 174 based on a signal PWI2 from controller 180. Inverters 164, 166 are each configured to include a three-phase bridge circuit, for example.

Although the present embodiment presents a configuration including two inverters and two motor generators corresponding thereto as described above, the number of each of motor generators and inverters is not limited thereto. For example, one pair of an inverter and a motor generator may be provided.

Secondary self-resonant coil 112 receives electric power through electromagnetic resonance using an electromagnetic field from the primary self-resonant coil included in power transmitting apparatus 200 described later in FIG. 5.

Capacitor 116 is a variable capacitor configured to have a variable capacitance and connected to both ends of secondary self-resonant coil 112. Capacitor 116 includes an actuator that is not shown. The capacitance of capacitor 116 is changed by controlling the actuator by a control signal CTL1 from power receiver ECU 185.

The number of turns of this secondary self-resonant coil 112 is appropriately set based on factors such as the distance between the secondary self-resonant coil 112 and the primary self-resonant coil of power transmitting apparatus 200, the resonance frequency of the primary self-resonant coil and secondary self-resonant coil 112, and the like, so that a Q factor representing the intensity of resonance of the primary self-resonant coil and secondary self-resonant coil 112 each (Q>100, for example), κ representing the degree of coupling of the coils and the like are large.

Secondary coil 114 is disposed coaxially with secondary self-resonant coil 112 and can be magnetically coupled to secondary self-resonant coil 112 through electromagnetic induction. Secondary coil 114 picks up, through electromagnetic induction, the electric power received by secondary self-resonant coil 112, and outputs the electric power to rectifier 140.

In addition, secondary self-resonant coil 112, secondary coil 114 and capacitor 116 as described above constitute power receiving unit 400 of power receiving apparatus 110.

Rectifier 140 rectifies the AC electric power picked up by secondary coil 114. DC/DC converter 142 converts the electric power rectified by rectifier 140 into a voltage level of power storage device 150 based on a signal PWD from controller 180, and outputs the resultant electric power to power storage device 150.

System main relay SMR2 is provided between DC/DC converter 142 and power storage device 150. When control signal SE2 from controller 180 is activated, system main relay SMR2 electrically connects power storage device 150 to DC/DC converter 142. When control signal SE2 is deactivated, system main relay SMR2 breaks the electrical path between power storage device 150 and DC/DC converter 142.

Voltage sensor 190 detects a voltage VH between rectifier 140 and DC/DC converter 142, and outputs the detected value to controller 180 and power receiver ECU 185.

Current sensor 195 is provided in a power line PL3 connecting rectifier 140 and DC/DC converter 142, and detects a current IH flowing through power line PL3. Then, current sensor 195 outputs the detection result to controller 180 and power receiver ECU 185.

Based on the degree to which the accelerator is pressed down, the vehicle's speed and signals from various sensors, controller 180 generates control signals PWC, PWI1, PWI2 for driving voltage step-up converter 162 and motor generators 172, 174, respectively, and outputs the generated control signals to voltage step-up converter 162 and inverters 164, 166, respectively. While the vehicle is traveling, controller 180 activates control signal SE1 to turn on system main relay SMR1 and deactivates control signal SE2 to turn off system main relay SMR2.

Controller 180 receives, from power transmitting apparatus 200 via communication unit 130, information (voltage and current) about electric power transmitted from power transmitting apparatus 200, and receives from voltage sensor 190 the detected value of voltage VH detected by voltage sensor 190. Based on the data as described above, controller 180 controls parking of the vehicle and the like so that the vehicle is guided toward power transmitting unit 220 of power transmitting apparatus 200 (FIG. 1).

Power receiver ECU 185 receives detected values of voltage VH and current IH detected by voltage sensor 190 and current sensor 195, respectively. Then, power receiver ECU 185 calculates received electric power PR supplied from power transmitting apparatus 200 based on the information as described above. Then, power receiver ECU 185 transmits this received electric power PR to power transmitting apparatus 200 via communication unit 130.

Power receiver ECU 185 also changes the capacitance of capacitor 116 by controlling the actuator (not shown) included in capacitor 116 by control signal CTL1.

When parking of the vehicle above power transmitting unit 220 is completed, controller 180 transmits a power feeding command to power transmitting apparatus 200 via communication unit 130, and activates control signal SE2 to turn on system main relay SMR2. Then, controller 180 generates signal PWD for driving DC/DC converter 142, and outputs the generated signal PWD to DC/DC converter 142.

Controller 180 and power receiver ECU 185 each include a CPU (Central Processing Unit), a memory device and an input/output buffer that are not shown, receive signals of sensors and output control commands to constituent devices, and control vehicle 100 or the devices. The control of these components is not limited to processing by means of software. The control may be partially performed using dedicated hardware (electronic circuit).

While FIG. 4 shows the configuration where controller 180 and power receiver ECU 185 are separate controllers, controller 180 and power receiver ECU 185 are not limited to such a configuration, and may be integrated into one controller. Further, a part of the functions of controller 180 may be performed by another controller.

Figure 5:
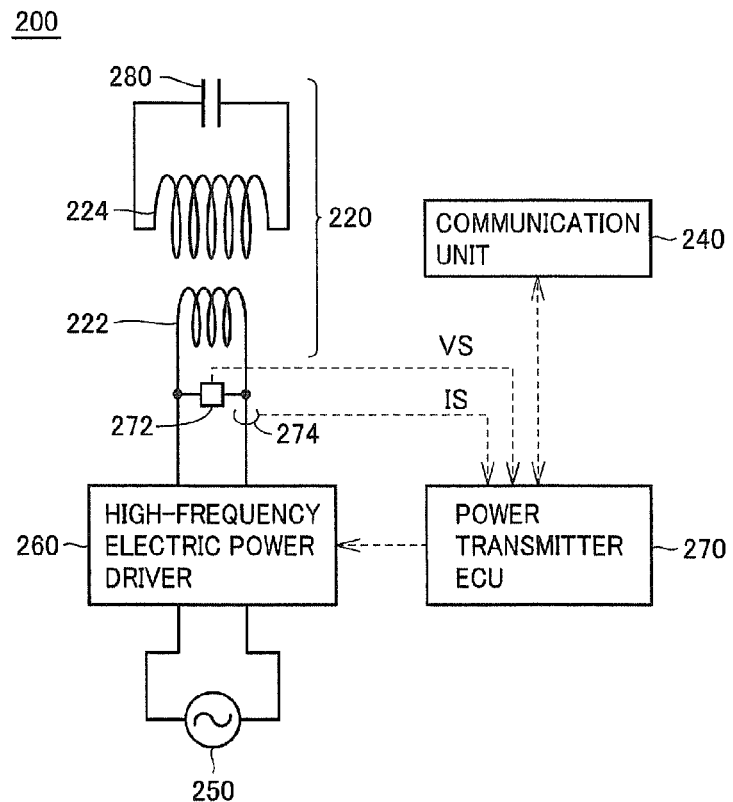
FIG. 5 is a detailed configuration diagram of a power transmitting apparatus shown in FIG. 1.

FIG. 5 is a detailed configuration diagram of power transmitting apparatus 200 shown in FIG. 1. Referring to FIG. 5, power transmitting apparatus 200 includes an AC power supply 250, a high-frequency electric power driver 260, a primary coil 222, a primary self-resonant coil 224, a voltage sensor 272, a current sensor 274, a communication unit 240, a power transmitter ECU 270, and a capacitor 280.

AC power supply 250 is a power supply located externally to the vehicle, and is a commercial power supply, for example. High-frequency electric power driver 260 converts electric power received from AC power supply 250 into high-frequency electric power, and supplies the resultant high-frequency electric power to primary coil 222. The frequency of the high-frequency electric power generated by high-frequency electric power driver 260 is 1 M to ten-odd MHz, for example.

Primary coil 222 is disposed coaxially with primary self-resonant coil 224, and can be magnetically coupled to primary self-resonant coil 224 through electromagnetic induction. The high-frequency electric power supplied from high-frequency electric power driver 260 is fed from primary coil 222 to primary self-resonant coil 224 through electromagnetic induction.

Primary self-resonant coil 224 has its two ends connected to capacitor 280 to form an LC resonant coil. Primary self-resonant coil 224 resonates with secondary self-resonant coil 112 of vehicle 100 through an electromagnetic field, and accordingly, transmits electric power to vehicle 100. In the case where the capacitance component for obtaining a predetermined resonance frequency can be implemented by the stray capacitance of primary self-resonant coil 224 itself, capacitor 280 is not disposed and the two ends of primary self-resonant coil 224 are non-connected (opened).

The number of turns of this primary self-resonant coil 224 is also appropriately set based on factors such as the distance between primary self-resonant coil 224 and secondary self-resonant coil 112 of vehicle 100 and the resonance frequencies of primary self-resonant coil 224 and secondary self-resonant coil 112, so that a Q factor (Q>100, for example), degree of coupling κ and the like are large.

Primary self-resonant coil 224, primary coil 222 and capacitor 280 are constituent components of power transmitting unit 220 shown in FIG. 1. Voltage sensor 272 detects a voltage VS that is output from high-frequency electric power driver 260, and outputs the detected value to power transmitter ECU 270. Current sensor 274 detects a current IS that is output from high-frequency electric power driver 260, and outputs the detected value to power transmitter ECU 270.

Receiving an activation command from vehicle 100 via communication unit 240, power transmitter ECU 270 activates power transmitting apparatus 200. Receiving a power feeding start command from vehicle 100 via communication unit 240, power transmitter ECU 270 controls the output of high-frequency electric power driver 260 so that the electric power supplied from power transmitting apparatus 200 to vehicle 100 is substantially equal to a target value.

When power transmitter ECU 270 receives, from power receiving apparatus 110 via communication unit 240, a signal output command for test power transmission, it controls the output of high-frequency electric power driver 260 so that predetermined electric power is output that is smaller than the electric power supplied during execution of power feeding based on the power feeding start command.

Figure 6:
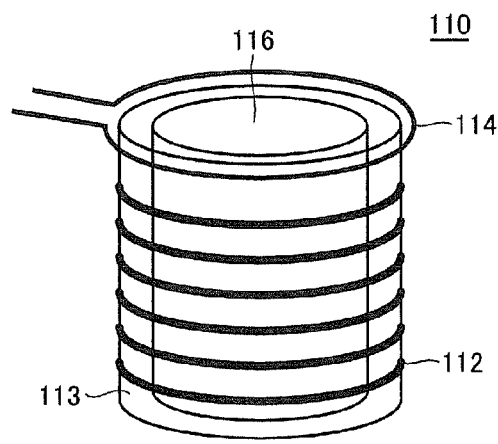
FIG. 6 is an external appearance of a coil unit included in a power receiving apparatus.

FIG. 6 is an external appearance of each coil unit included in power receiving apparatus 110 and power transmitting apparatus 200. In FIG. 6, power receiving unit 400 of power receiving apparatus 110 will be described by way of example.

Referring to FIG. 6, power receiving unit 400 includes secondary coil 114, secondary self-resonant coil 112, a bobbin 113, and a capacitor 116.

Secondary coil 114 is configured such that a coil member is wound along the inner surface or the outer surface of bobbin 113. Then, secondary coil 114 is disposed coaxially with secondary self-resonant coil 112. The two ends of secondary coil are drawn to the outside of a coil case (not shown) housing power receiving unit 400, and connected to a load. Then, secondary coil 114 receives electric power from secondary self-resonant coil 112 through electromagnetic induction.

Capacitor 116 is a variable capacitor having a variable capacitance as described above and is disposed within bobbin 113. Capacitor 116 is connected to both ends of secondary self-resonant coil 112 to form an LC resonance circuit.

Figure 7:
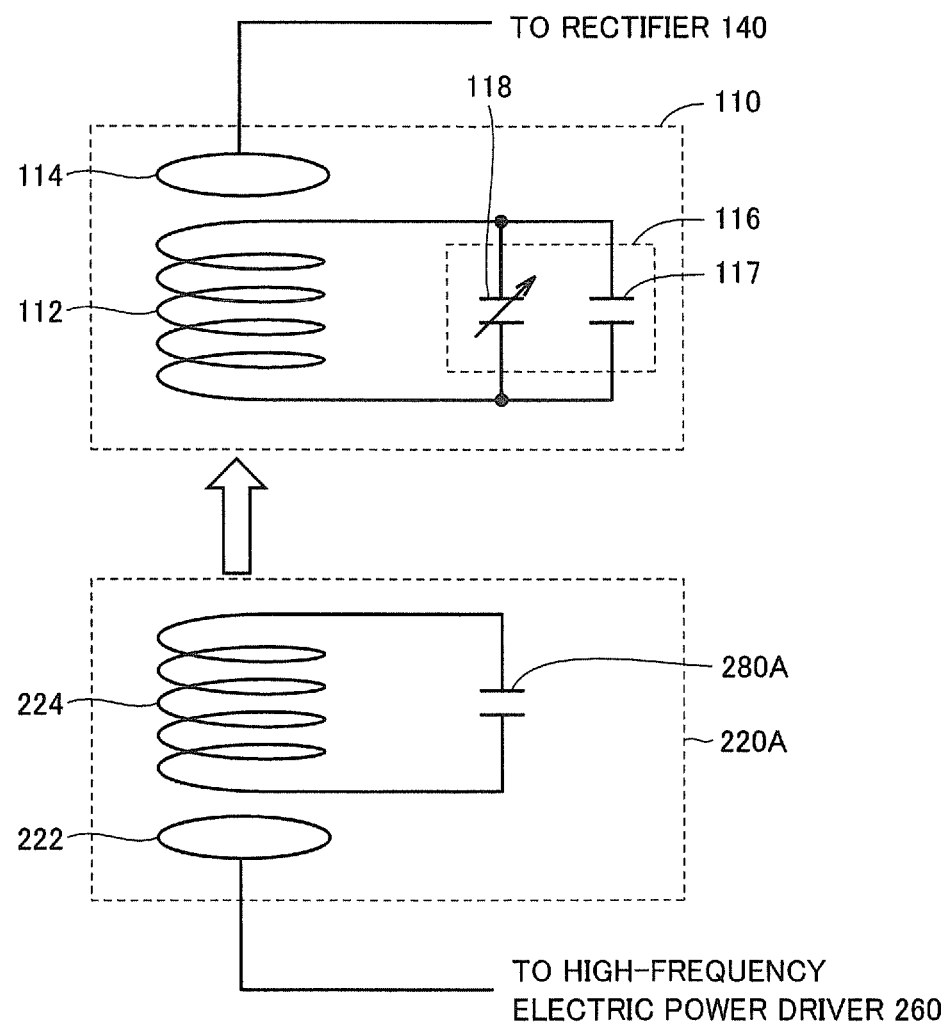
FIG. 7 is a diagram showing an example of each circuit in the power receiving apparatus and a power transmitting unit in the first embodiment.

In addition, although capacitor 116 may be one capacitor having a variable capacitance, it may be configured to include a capacitor 117 of large capacitance having a fixed capacitance and a capacitor 118 of small capacitance having a variable capacitance that are connected in parallel to secondary self-resonant coil 112, as shown in FIG. 7. Generally, the capacitor having a variable capacitance may be often more expensive than the capacitor having a capacitance that is fixed at the same value. Accordingly, as shown in FIG. 7, by using variable capacitor 118 of small capacitance having a required variable range and capacitor 117 having a large and fixed capacitance that is close to the prescribed reference capacitance determined based on the design value, cost reduction can be expected as compared with the case where a single variable capacitor having a relatively large variable range is provided.

In the contactless power feeding using the resonance method, electric power is transmitted by causing primary self-resonant coil 224 and secondary self-resonant coil 112 to resonate at a prescribed resonance frequency. When the resonance frequency of the coil unit is set in each of power transmitting unit 220 and power receiving unit 400, in the case where power transmitting unit 220 and power receiving unit 400 are spaced apart from each other at a target reference distance, design and adjustment are made such that the coil units resonates with each other at a prescribed electromagnetic field frequency (that is, the power supply frequency of high-frequency power supply driver 260). During actual power feeding, however, the distance between the units is displaced from the reference distance due to the displacement of the position at which the vehicle is stopped, the difference of the bottom height of the vehicle' body resulting from the difference between types of vehicles. Consequently, the space impedance between the units varies to cause an increase in the reflected electric power and also cause a change in the electromagnetic field intensity, which may lead to deterioration in the electric power transmission efficiency.

Figure 8:
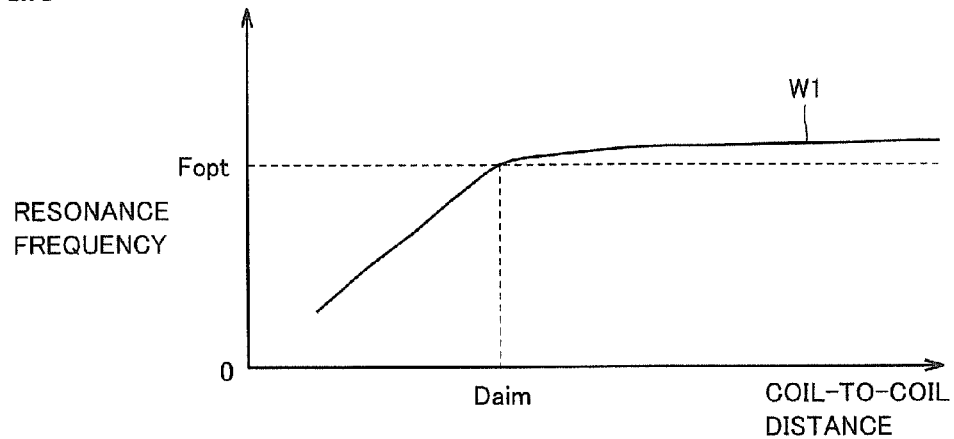
FIG. 8 is a diagram for illustrating the relation between the coil-to-coil distance from a primary self-resonant coil to a secondary self-resonant coil and the resonance frequency at the maximized electric power transmission efficiency.

FIG. 8 is a diagram for illustrating the relation between the coil-to-coil distance from the primary self-resonant coil to the secondary self-resonant coil and the resonance frequency at the maximized electric power transmission efficiency. In FIG. 8, the horizontal axis shows a coil-to-coil distance while the vertical axis shows a resonance frequency.

Referring to FIG. 8, at a certain target reference distance Daim, the resonance frequency at which the electric power transmission efficiency is maximized is assumed to be Fopt. In this case, when the coil-to-coil distance changes from the reference distance, the resonance frequency at which the transmission efficiency is maximized varies in accordance with the change in the distance, as shown by line W1 in FIG. 8.

Based on the above-described characteristics, it is also possible to change the frequency of the high-frequency power supply in accordance with the coil-to-toil distance. On the other hand, the available electromagnetic field frequency range may be limited by regulations such as the Radio Law, with the result that a desired frequency cannot be selected.

Accordingly, in the present embodiment, maximum electric power control is performed for controlling the resonance frequency of the coil unit by changing the capacitor capacitance of the coil unit so as to maximize the electric power transmission efficiency while maintaining the frequency at the prescribed electromagnetic field frequency defined by the Radio Law and the like even when the coil-to-coil distance changes.

Figure 9:
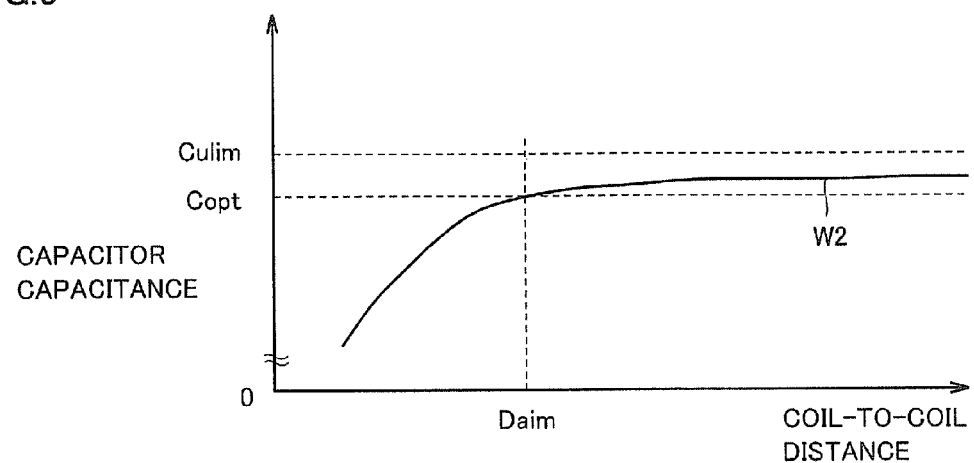
FIG. 9 is a diagram showing an example of the capacitor capacitance at which the electric power transmission efficiency is maximized when the coil-to-coil distance changes in the state where the resonance frequency is fixed at a prescribed frequency.

FIG. 9 is a diagram showing an example of the capacitor capacitance so as to maximize the electric power transmission efficiency when the coil-to-coil distance changes in the state where the electromagnetic field frequency is kept at a certain value (for example, 13 MHz). In FIG. 9, the horizontal axis shows a coil-to-coil distance while the vertical axis shows a capacitor capacitance. It is to be noted that Culim in the figure shows the maximum capacitance of the variable capacitor.

Referring to FIG. 9, at the prescribed electromagnetic field frequency, when the reference capacitor capacitance at which the transmission efficiency is maximized at target reference distance Daim (which will be hereinafter referred to as a "reference capacitor capacitance") is Copt, the coil-to-coil distance is changed to cause the capacitor capacitance at the maximized transmission efficiency to be changed as shown by line W2 in the figure. As seen from line W2, the changing amount of the capacitor capacitance is greater in the case where the coil-to-coil distance is shorter than the reference distance than the case where the coil-to-coil distance is greater than the reference distance. The reason thereof will be described with reference to FIGS. 10 and 11.

Figure 10:
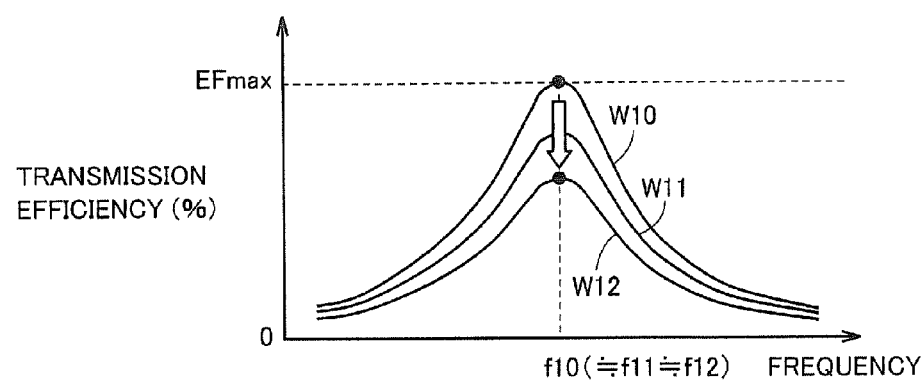
FIG. 10 is a diagram showing an example of the relation between the resonance frequency and the transmission efficiency in the case where the coil-to-coil distance is increased.
Figure 11:
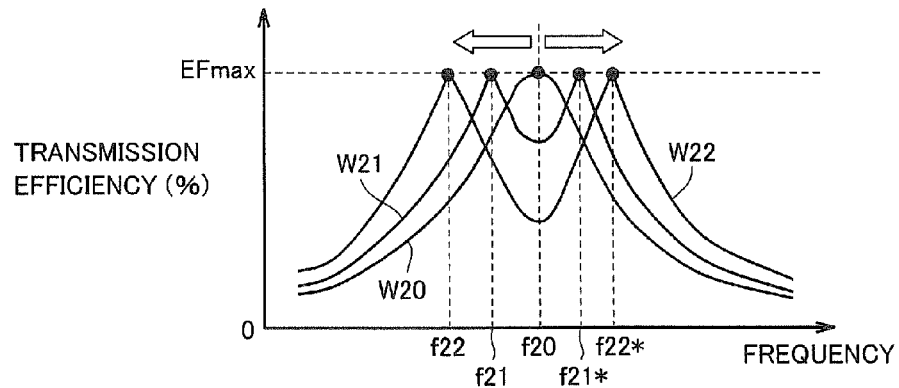
FIG. 11 is a diagram showing an example of the relation between the resonance frequency and the transmission efficiency in the case where the coil-to-coil distance is reduced.

FIGS. 10 and 11 each are a diagram showing an example of the relation between the resonance frequency and the transmission efficiency in the case where the coil-to-coil distance is changed. FIG. 10 shows the case where the coil-to-coil distance is increased (spaced away from each other) while FIG. 11 shows the case where the coil-to-coil distance is decreased (brought closer to each other).

Referring to FIG. 10, line W10 shows the transmission efficiency in the case where the coil-to-coil distance is equal to the reference distance, in which the resonance frequency at the maximized transmission efficiency is assumed to be f10. When the coil-to-coil distance is increased from this state, the maximum value of the transmission efficiency is gradually decreased as shown by lines W11 and W12. This is due to such a great influence that the electromagnetic field intensity is gradually decreased in accordance with an increase in the coil-to-coil distance. In this case, the resonance frequency at which the transmission efficiency is maximized does not significantly change.

On the other hand, when the coil-to-coil distance is decreased for example as shown by line W21 in FIG. 11, the frequency at which the transmission efficiency is maximized (f21, f21*) is gradually extended in the directions in which the frequency is raised and lowered with respect to a frequency f20 at the reference distance. The transmission efficiency is decreased between the frequencies each at which the transmission efficiency is maximized (between f21 and f21*). This is because the shorter the coil-to-coil distance is, the more greatly the space impedance between the coils is changed, thereby increasing the reflected electric power.

Thus, in maximum electric power control according to the present embodiment, the capacitor capacitance is changed so as to maximize the transmission efficiency in the state where the electromagnetic field frequency is maintained at a prescribed frequency with respect to the change in the coil-to-coil distance. In other words, for example, in the case of line W21 in FIG. 11, the capacitor capacitance is adjusted to change the resonance frequency of the coil unit, to entirely displace line W21 such that a frequency f21 at which the transmission efficiency is maximized conform to frequency f20.

In this case, as apparent from FIGS. 10 and 11, when the coil-to-coil distance is increased, the changing amount of the frequency is decreased, which results in a decrease in the changing amount of the capacitor capacitance. On the other hand, when the coil-to-coil distance is decreased, the changing amount of the frequency is relatively increased, which requires the changing amount of the capacitor capacitance to be also increased.

Figure 12:
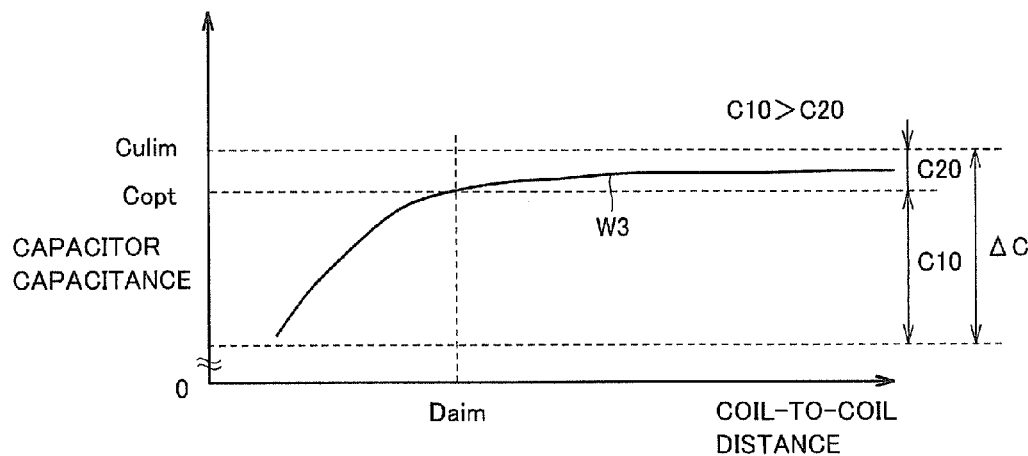
FIG. 12 is a diagram for illustrating the relation between the capacitor's variable range and the reference capacitor capacitance.

Therefore, as shown in FIG. 12, in a capacitor's capacitance variable range AC that is required in accordance with change in the coil-to-coil distance, the variable range in the direction in which the coil-to-coil distance is decreased with respect to the reference distance (C10 in the figure) should be greater than the variable range in the direction in which the coil-to-coil distance is increased with respect to the reference distance (C20 in the figure). In other words, the capacitor capacitance is set such that reference capacitor capacitance value Copt is greater than the median value of the capacitor's variable range.

Figure 13:
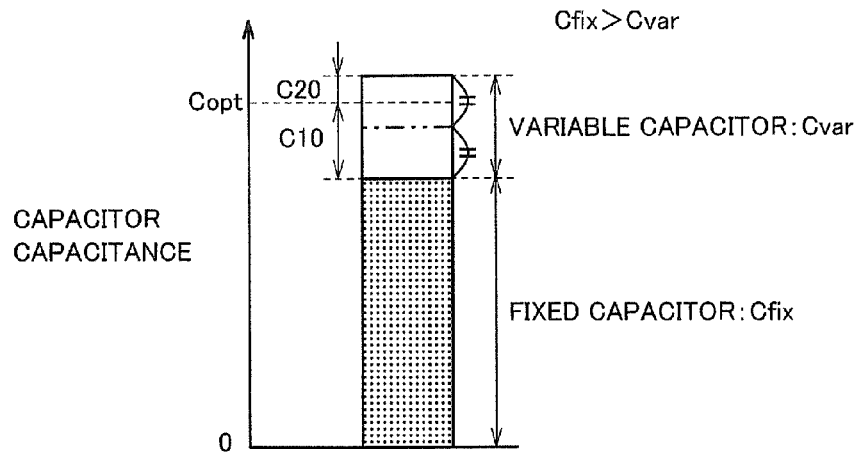
FIG. 13 is a diagram showing an example of setting of the capacitor capacitance in consideration of the capacitor's variable range.

FIG. 13 is a diagram showing an example of setting of the capacitor capacitance in consideration of the capacitor's variable range, as described above. Referring to FIG. 13, as described in FIG. 12, based on capacitor capacitance Copt determined from the reference distance, maximum capacitance Cvar of the variable capacitor is determined from required capacitance variable ranges C10 and C20 (Cvar=C10+C20). Then, the capacitance obtained by subtracting variable capacitance C10 in the decreasing direction from capacitor capacitance Copt determined from the reference distance is set as a capacitance Cfix of the fixed capacitor (Cfix=Copt−C10). Thus, the optimal capacitor capacitance having a suitable variable range can be set.

Figure 14:
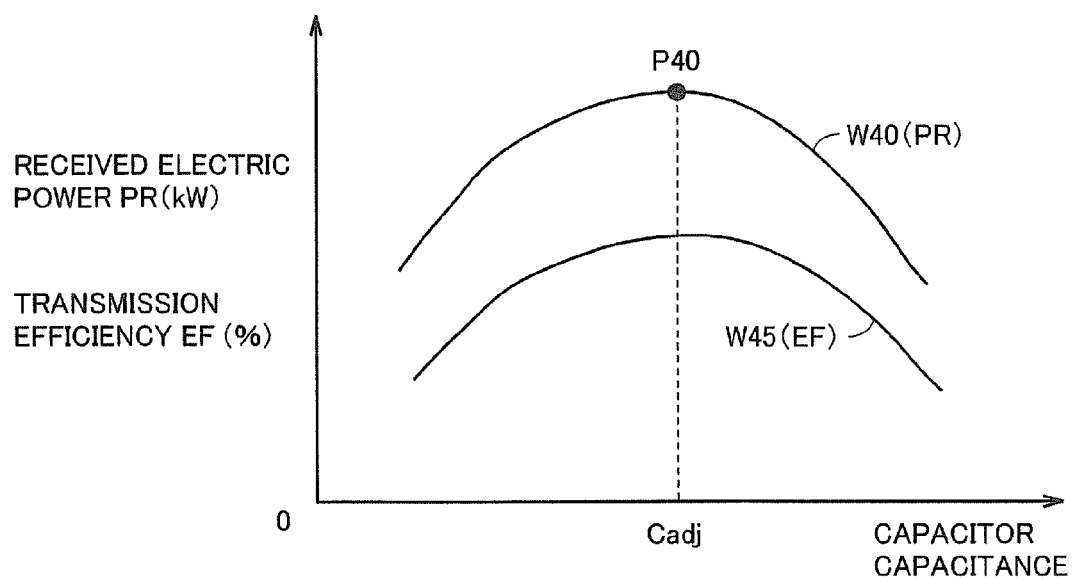
FIG. 14 is a diagram showing an example of changes in the received electric power received by the power receiving apparatus and the electric power transmission efficiency at the time when the capacitor capacitance is changed in the state where the resonance frequency is fixed at a prescribed frequency, in the first embodiment.

In the present embodiment including such a variable capacitor, FIG. 14 shows an example of changes in received electric power PR received by power receiving apparatus 110 and electric power transmission efficiency EF in the case where the capacitor capacitance is changed in the state where the electromagnetic field frequency is fixed at a prescribed frequency. In FIG. 14, line W40 shows received electric power PR while line W41 shows transmission efficiency EF.

As described in FIG. 9 and the like, in the state where the electromagnetic field frequency is fixed at a prescribed frequency, when the coil-to-coil distance is determined, the capacitor capacitance at which the transmission efficiency is maximized is determined accordingly. In this case, since transmission efficiency EF can generally be represented by an equation (1), transmission efficiency EF is almost maximized basically when received electric power PR in power receiving apparatus 110 is at its maximum.

$$\text{Transmission efficiency} = \text{received electric power} / \text{transmitted electric power} \quad (1)$$

Therefore, during transmission of electric power from power transmitting unit 220, received electric power PR is detected while changing the variable capacitor's value, to search for the point at which this received electric power PR is at its maximum (P40 in FIG. 14). Then, the variable capacitor is set to have a capacitor capacitance obtained at the point at which this received electric power PR is at its maximum (Cadj in FIG. 14), so that transmission efficiency EF can be maximized.

Figure 15:
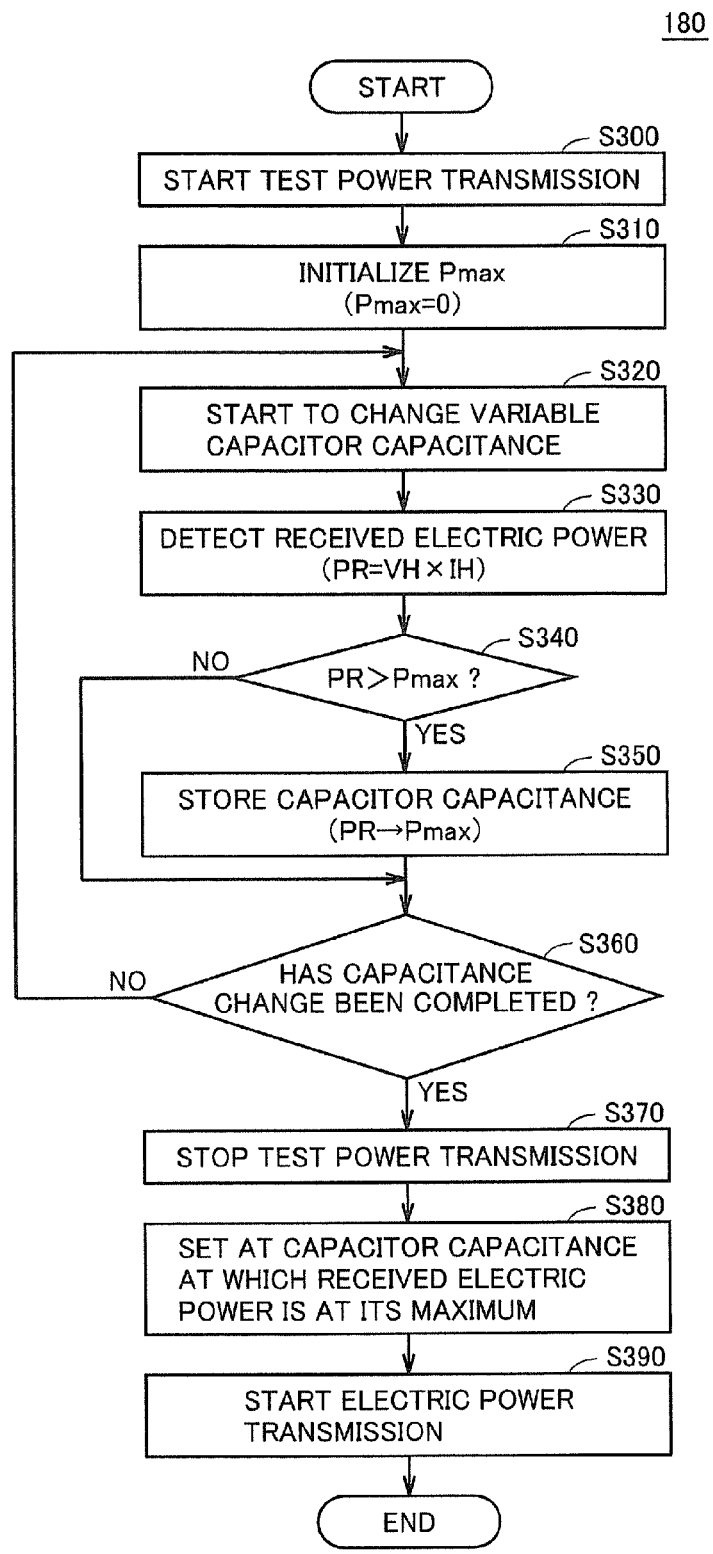
FIG. 15 is a flowchart for illustrating an electric power maximum control process performed in a power receiver ECU in the first embodiment.

FIG. 15 is a flowchart for illustrating an electric power maximum control process performed in power receiver ECU 185 in the first embodiment. Each step in the flowchart shown in FIG. 15 is implemented by executing the program stored in advance in power receiver ECU 185 in predetermined cycles. Alternatively, in some of the steps, the process can be implemented by dedicated hardware (an electronic circuit).

Referring to FIG. 15, when detecting in step (which will be hereinafter abbreviated as S) 300 that vehicle 100 is stopped above power transmitting unit 220, power receiver ECU 185 requests, via communication unit 130, power transmitter ECU 270 on the power transmitting apparatus 200 side to start test power transmission. In response to this request, for test power transmission, power transmitter ECU 270 starts transmission of electric power with an output lower than that during practical and regular power transmission.

In S310, power receiver ECU 185 initializes a memory value Pmax corresponding to the maximum value of the received electric power of the memory unit (not shown) within power receiver ECU 185 (for example, sets at zero).

Then, in S320, power receiver ECU 185 outputs control signal CTL1 to capacitor 116, and starts to change the capacitance of variable capacitor 118 within capacitor 116. For example, power receiver ECU 185 increases the capacitance of variable capacitor 118 by a prescribed changing amount from the minimum capacitance to the maximum capacitance, and then, performs the process from S320 to subsequent S350.

In S330, power receiver ECU 185 calculates received electric power PR based on the detected values of voltage VH from voltage sensor 190 and current IH from current sensor 195.

Then, in S340, power receiver ECU 185 compares received electric power PR obtained by calculation with the stored maximum value Pmax of the received electric power, to determine whether or not received electric power PR is greater than memory value Pmax.

When received electric power PR is greater than memory value Pmax (YES in S340), the process proceeds to S350, in which power receiver ECU 185 sets the value of received electric power PR as maximum value Pmax of the received electric power and stores the capacitor capacitance at that time. Then, the process proceeds to S360.

On the other hand, when received electric power PR is not more than memory value Pmax (NO in S340), the process in S350 is skipped and proceeds to S360.

In S360, power receiver ECU 185 determines whether or not capacitance change of variable capacitor 118 has been completed. For example, when the capacitance of variable capacitor 118 is increased by a prescribed changing amount from the minimum capacitance to the maximum capacitance as described above, completion of this capacitance change is determined depending on whether or not the capacitance of variable capacitor 118 is at its maximum capacitance.

When capacitance change of variable capacitor 118 has not been completed (NO in S360), the process is returned to S320 to further change the capacitance of variable capacitor 118. Then, the process of S330 to S350 is repeated. In this way, it becomes possible to calculate received electric power PR for each capacitance value throughout the variable capacitance range of variable capacitor 118, and also possible to determine the capacitor capacitance value at the time when the calculated received electric power PR is at its maximum (that is, when the transmission efficiency is maximized).

When capacitance change of variable capacitor 118 has been completed (YES in S360), power receiver ECU 185 requests power transmitter ECU 270 to stop test power transmission in S370. Then, in S380, power receiver ECU 185 sets the capacitance of variable capacitor 118 to be equivalent to the stored capacitor capacitance value.

Then, in S390, power receiver ECU 185 requests power transmitter ECU 270 to start practical and regular electric power transmission.

By the control in accordance with the process as described above, the capacitor capacitance can be set so as to maximize the transmission efficiency in the state where the electromagnetic field frequency is maintained at a prescribed frequency. Accordingly, in the contactless electric power feeding system using a resonance method, deterioration in transmission efficiency can be suppressed even in the case where the coil-to-coil distance is changed from the reference distance at the time of design.

Second Embodiment

In the first embodiment, an explanation has been given with regard to the configuration in which the coil unit on the vehicle side includes a variable capacitor having a capacitance that is adjusted to thereby suppress deterioration in electric power transmission efficiency when the coil-to-coil distance is changed.

In the second embodiment, an explanation will be given with regard to the configuration in which the capacitor on the power transmitting apparatus side has a variable capacitance that is adjusted to thereby suppress deterioration in electric power transmission efficiency.

Figure 16:
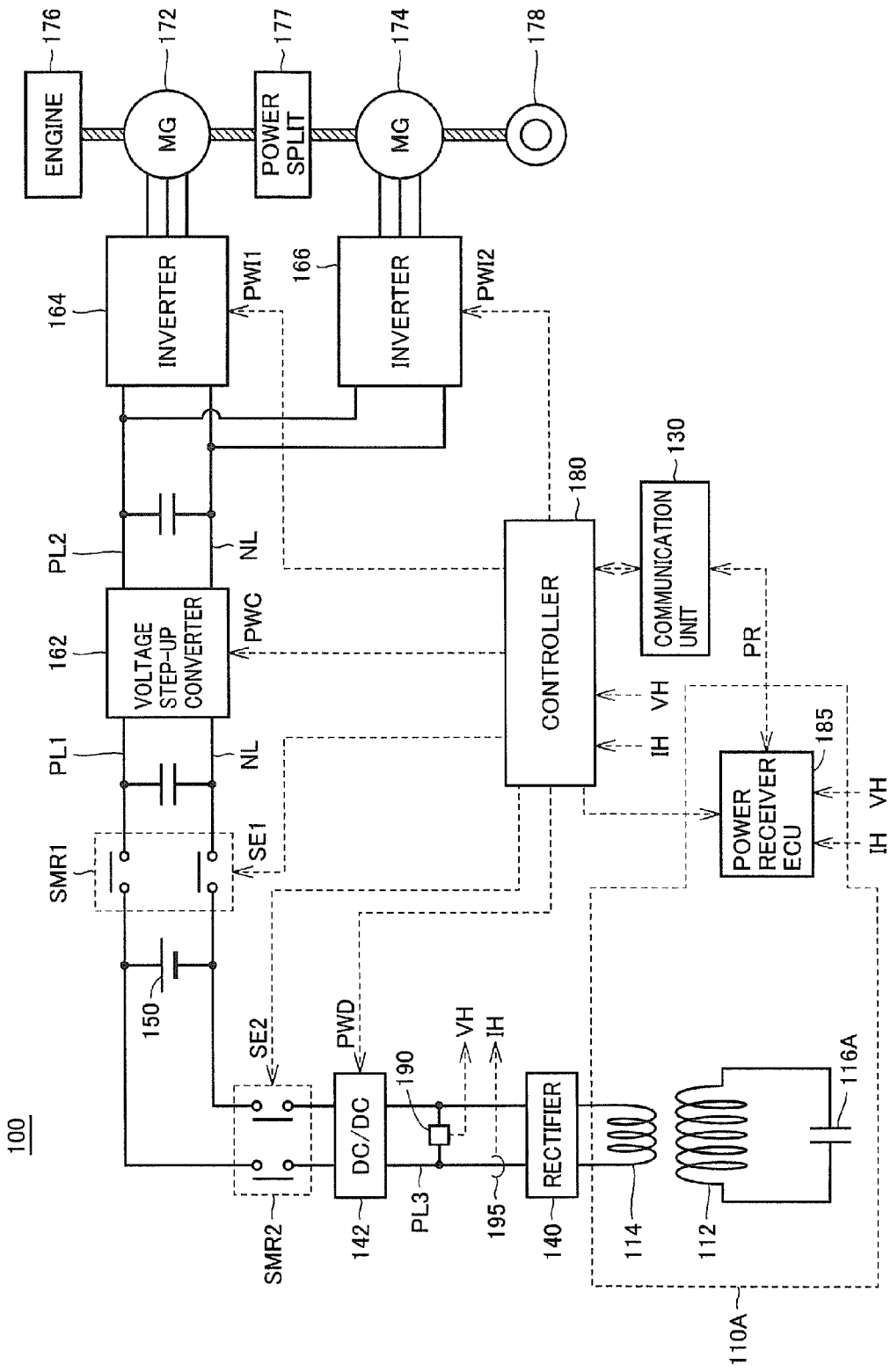
FIG. 16 is a detailed configuration diagram of a vehicle in the second embodiment.

FIG. 16 is a detailed configuration diagram of vehicle 100 in the second embodiment. In FIG. 16, capacitor 116 in FIG. 4 in the first embodiment is replaced with a capacitor 116A having a fixed capacitance.

Figure 17:
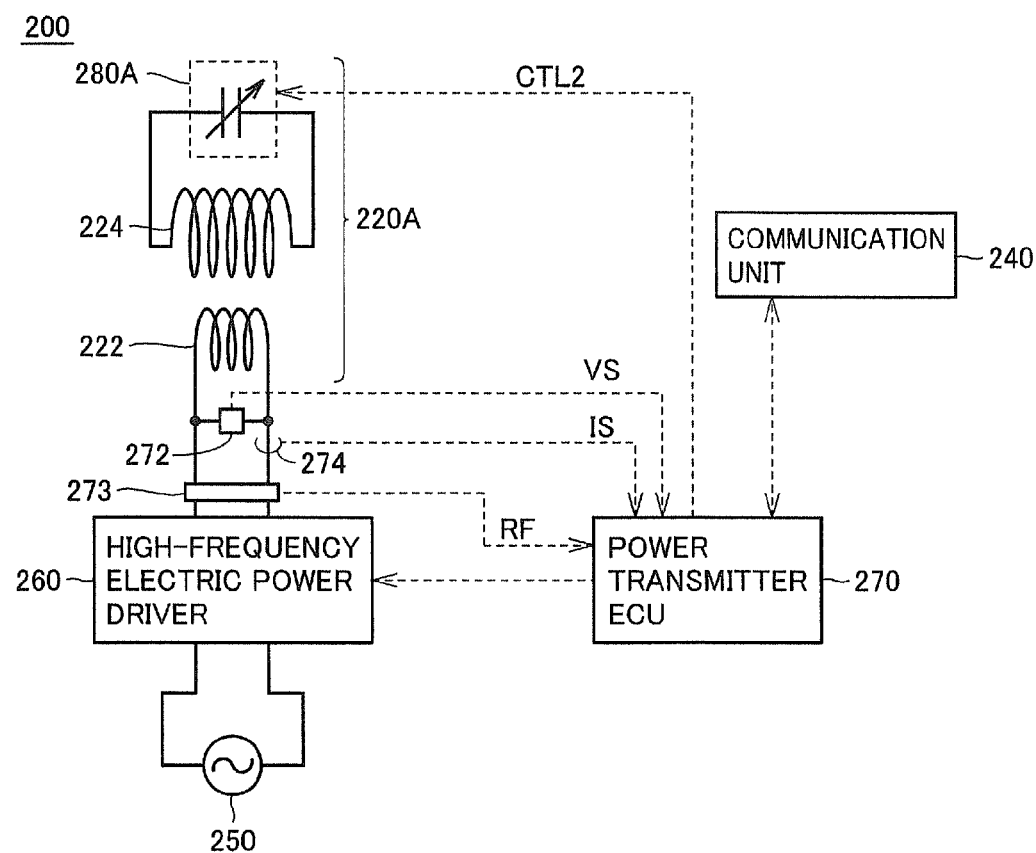
FIG. 17 is a detailed configuration diagram of a power transmitting apparatus in the second embodiment.

FIG. 17 is also a detailed configuration diagram of power transmitting apparatus 200 in the second embodiment. In FIG. 17, capacitor 280 in FIG. 5 in the first embodiment is replaced with a capacitor 280A having a variable capacitance while a reflected electric power meter 273 for detecting the reflected electric power reflected from a power receiving apparatus 110A is added.

The same elements as those in FIGS. 4 and 5 will not be explained in FIGS. 16 and 17.

Referring to FIG. 17, capacitor 280A is connected to both ends of primary self-resonant coil 224. Capacitor 280A includes an actuator that is not shown. The actuator is controlled by a control command CTL2 from power transmitter ECU 270, thereby changing the capacitance of capacitor 280A.

Reflected electric power meter 273 is provided between high-frequency power driver 260 and primary coil 222. Reflected electric power meter 273 detects the reflected electric power reflected from power receiving apparatus 110A, and outputs its detected value RF to power transmitter ECU 270.

Figure 18:
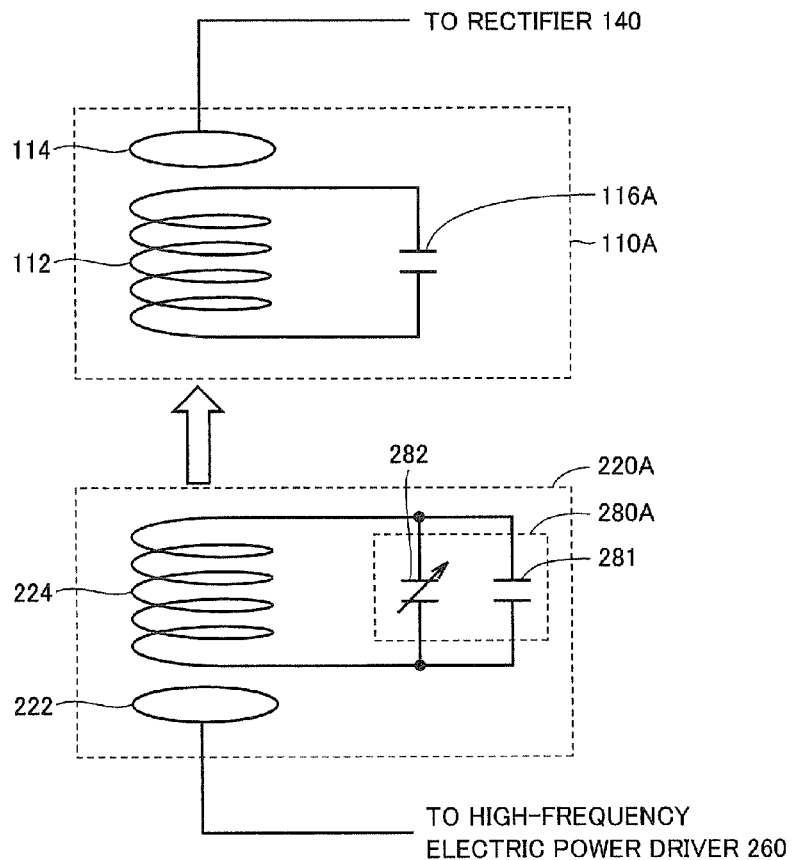
FIG. 18 is a diagram showing an example of each circuit in a power receiving apparatus and a power transmitting unit in the second embodiment.

FIG. 18 is a diagram showing an example of each circuit in power receiving apparatus 110A and a power transmitting unit 220A in the second embodiment.

Referring to FIG. 18, capacitor 280A included in power transmitting unit 220A includes a large capacitance capacitor 281 having a fixed capacitance and a small capacitance capacitor 281 having a variable capacitance that are connected to primary self-resonant coil 224 in parallel with each other, as with capacitor 116 on the power receiving apparatus 110 side in the first embodiment. Although capacitor 280A can also be configured as one capacitor having a variable capacitance, it is suitable in terms of cost that capacitor 280A is configured to include capacitor 281 having a fixed capacitance and a capacitor 282 having a variable capacitance as described above.

Figure 19:
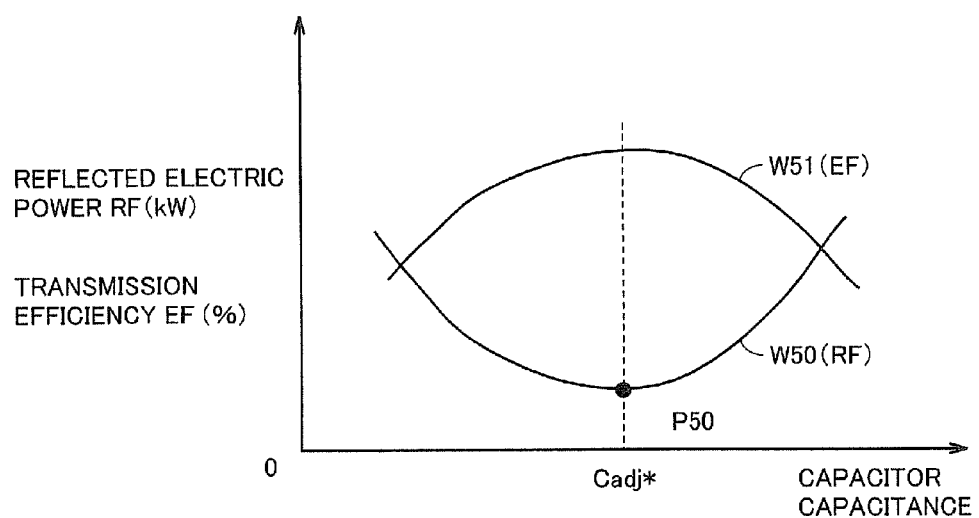
FIG. 19 is a diagram showing an example of changes in the reflected electric power detected by the power transmitting apparatus and the electric power transmission efficiency at the time when the capacitor capacitance is changed in the state where the resonance frequency is fixed at a prescribed frequency, in the second embodiment.

FIG. 19 is a diagram for illustrating electric power maximum control in the second embodiment, and shows an example of changes in reflected electric power RF detected by power transmitting apparatus 200 and electric power transmission efficiency EF at the time when the capacitor capacitance is changed in the state where the resonance frequency is fixed at a prescribed frequency. In FIG. 19, line W50 shows reflected electric power RF while line W51 shows transmission efficiency EF.

Generally, the relation represented by an equation (2) is established between received electric power PR received by power receiving apparatus 110A and reflected electric power RF.

$$\text{Received electric power} = \text{transmitted electric power} - \text{reflected electric power} - \text{loss} \tag{2}$$

When this equation (2) is applied for the above-described equation (1), transmission efficiency EF can be rewritten as in an equation (3).

$$\text{Transmission efficiency} = (\text{transmitted electric power} - \text{reflected electric power} - \text{loss})/\text{transmitted electric power} \tag{3}$$

As seen from this equation (3), during electric power transmission, when the loss variation is relatively small that is caused by the circuit resistance component and the electromagnetic field shield preventing leakage of an electromagnetic field, the smaller the reflected electric power RF is, the greater the transmission efficiency is. Therefore, the capacitance of capacitor 280A included in power transmitting unit 220A is changed, and the capacitance of capacitor 280A is set at a capacitor capacitance Cadj* at the point at which reflected electric power RF achieved at this capacitance change is minimized (P50 in FIG. 19), thereby allowing transmission efficiency EF to be maximized.

In addition, power transmitter ECU 270 may receive received electric power PR detected by power receiving apparatus 110A from power receiver ECU 185 and set the capacitance of capacitor 280A so as to maximize received electric power PR as in the first embodiment.

Figure 20:
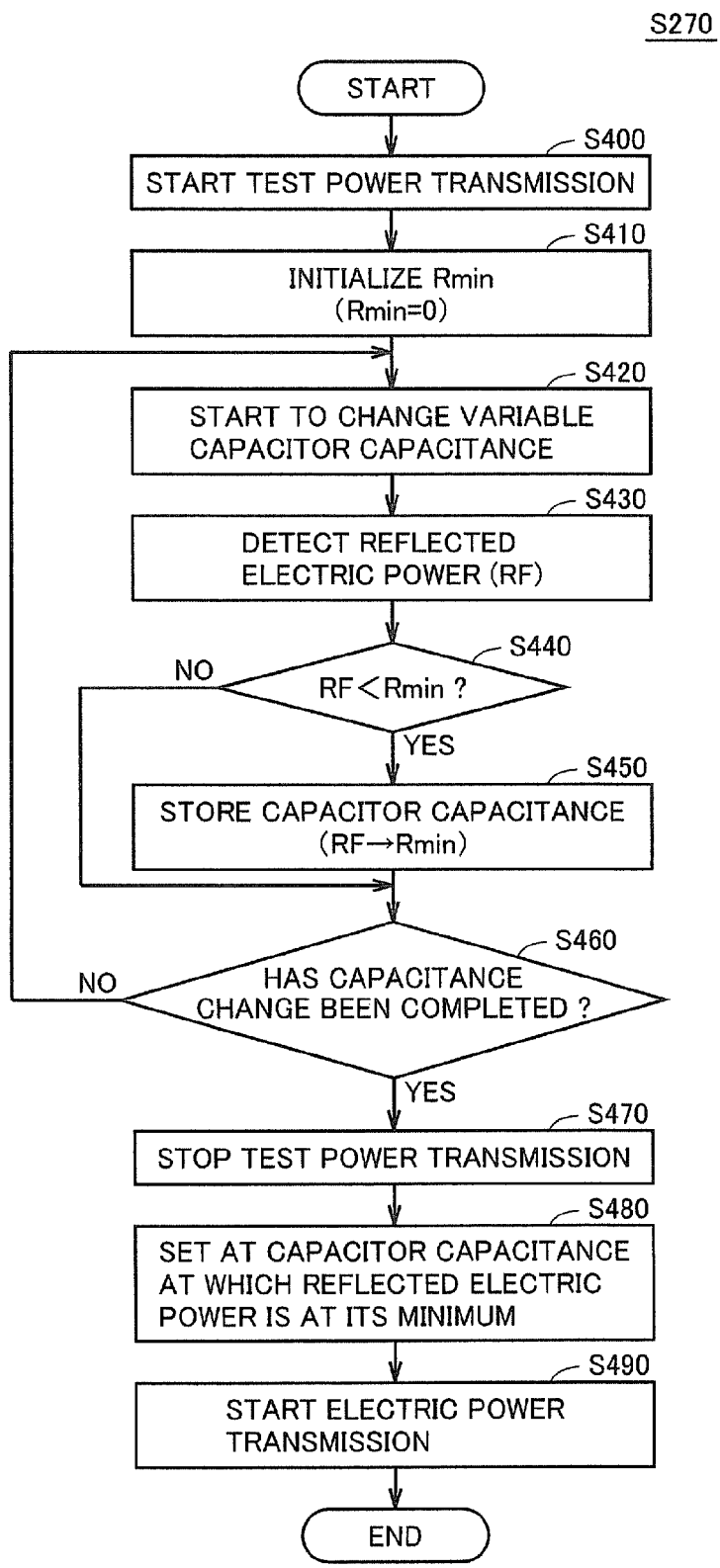
FIG. 20 is a flowchart for illustrating an electric power maximum control process performed in a power transmitter ECU in the second embodiment.

FIG. 20 is a flowchart for illustrating the electric power maximum control process performed in power transmitter ECU 270 in the second embodiment. Each step in the flowchart shown in FIG. 20 is implemented by executing the program stored in advance in power transmitter ECU 270 in predetermined cycles. Alternatively, in some of the steps, the process can be implemented by dedicated hardware (an electronic circuit).

Referring to FIG. 20, in S400, when it is detected that vehicle 100 has been stopped above power transmitting unit 220, power transmitter ECU 270 starts test power transmission for transmitting electric power with an output lower than that during practical and regular power transmission.

In S410, power transmitter ECU 270 initializes a memory value Rmin corresponding to the minimum value of the reflected electric power of the memory unit (not shown) within power transmitter ECU 270. An initial value K of the reflected electric power at this time is set at a value, for example, approximately equal to the transmitted electric power.

Then, in S420, power transmitter ECU 270 outputs control signal CTL2 to capacitor 280A, and starts to change the capacitance of variable capacitor 281 within capacitor 280A. For example, power transmitter ECU 270 increases the capacitance of variable capacitor 281 by a prescribed changing amount from the minimum capacitance to the maximum capacitance, and then, performs the process from S420 to subsequent S450.

In S430, power transmitter ECU 270 obtains the detected value of reflected electric power RF from reflected electric power meter 273.

Then, in S440, power transmitter ECU 270 compares reflected electric power RF with the stored minimum value Rmin of the reflected electric power, to determine whether or not reflected electric power RF is smaller than memory value Rmin.

When reflected electric power RF is smaller than memory value Rmin (YES in S440), the process proceeds to S450, in which power transmitter ECU 270 sets the value of this reflected electric power RF as minimum value Rmin of the reflected electric power and stores the capacitor capacitance at that time. Then, the process proceeds to S460.

On the other hand, when reflected electric power RF is not less than memory value Rmin (NO in S440), the process in S450 is skipped and proceeds to S460.

In S460, power transmitter ECU 270 determines whether or not capacitance change of variable capacitor 281 has been completed. For example, when the capacitance of variable capacitor 281 is increased by a prescribed changing amount from the minimum capacitance to the maximum capacitance as described above, completion of this capacitance change is determined depending on whether or not the capacitance of variable capacitor 281 is at its maximum capacitance.

When capacitance change of variable capacitor 281 has not been completed (NO in S460), the process is returned to S420 in which the capacitance of variable capacitor 281 is further changed. Then, the process in S430 to S450 is repeated. In this way, it becomes possible to calculate reflected electric power RF for each capacitance value throughout the variable capacitance range of variable capacitor 281, and, by comparing the calculated reflected electric power RF, also possible to determine the capacitor capacitance value at the time when reflected electric power RF is at its minimum (that is, transmission efficiency is maximized).

When capacitance change of variable capacitor 281 has been completed (YES in S460), power transmitter ECU 270 stops test power transmission in S470. Then, in S480, power transmitter ECU 270 sets the capacitance of variable capacitor 281 to be equal to the stored capacitor capacitance value. Then, power transmitter ECU 270 starts practical and regular electric power transmission in S490.

By the control in accordance with the process as described above, the capacitor capacitance of the power transmitting apparatus can be set so as to maximize the transmission efficiency in the state where the electromagnetic field frequency is maintained at a prescribed frequency. Accordingly, in the contactless electric power feeding system using a resonance method, deterioration in the transmission efficiency can be suppressed even when the coil-to-coil distance is changed from the reference distance at the time of design.

Third Embodiment

In each of the first and second embodiments, an explanation has been given with regard to the case where a capacitor having a variable capacitance is provided in the coil unit in one of the power receiving apparatus and the power transmitting apparatus.

In the third embodiment, an explanation will be given with regard to the configuration in which a variable capacitor is provided in each of the power receiving apparatus and the power transmitting apparatus, and the capacitances of both capacitors are adjusted in synchronization with each other, thereby suppressing deterioration in transmission efficiency. In this way, by adjusting both capacitors in the power receiving apparatus and the power transmitting apparatus, the impedances of both coil units can be matched to each other, so that the reflected electric power can be decreased. Accordingly, it can be expected that deterioration in transmission efficiency can be further suppressed as compared with the first and second embodiments.

In the third embodiment, the detailed configurations of vehicle 100 and power transmitting apparatus 200 are similar to those in FIGS. 4 and 17, respectively. In the following, an explanation will be given with regard to the case where the capacitor capacitance at the maximized transmission efficiency is searched by power transmitter ECU 270 using received electric power PR calculated on the power receiving apparatus 110 side. Thus, power receiver ECU 185 outputs received electric power PR calculated based on the detected values from voltage sensor 190 and current sensor 195 to power transmitter ECU 270 via communication units 130 and 240. Power transmitter ECU 270 determines the capacitor capacitance at the time when this received electric power PR is at its maximum. Then, power receiver ECU 185 and power transmitter ECU 270 set capacitances of capacitors 116 and 280A, respectively, in accordance with the determined capacitor capacitance. In addition, as in the first embodiment, power receiver ECU 185 may use received electric power PR to determine the capacitor capacitance at which the transmission efficiency is maximized. Also, as in the second embodiment, power transmitter ECU 270 may use reflected electric power RF to determine the capacitor capacitance at which the transmission efficiency is maximized.

Figure 21:
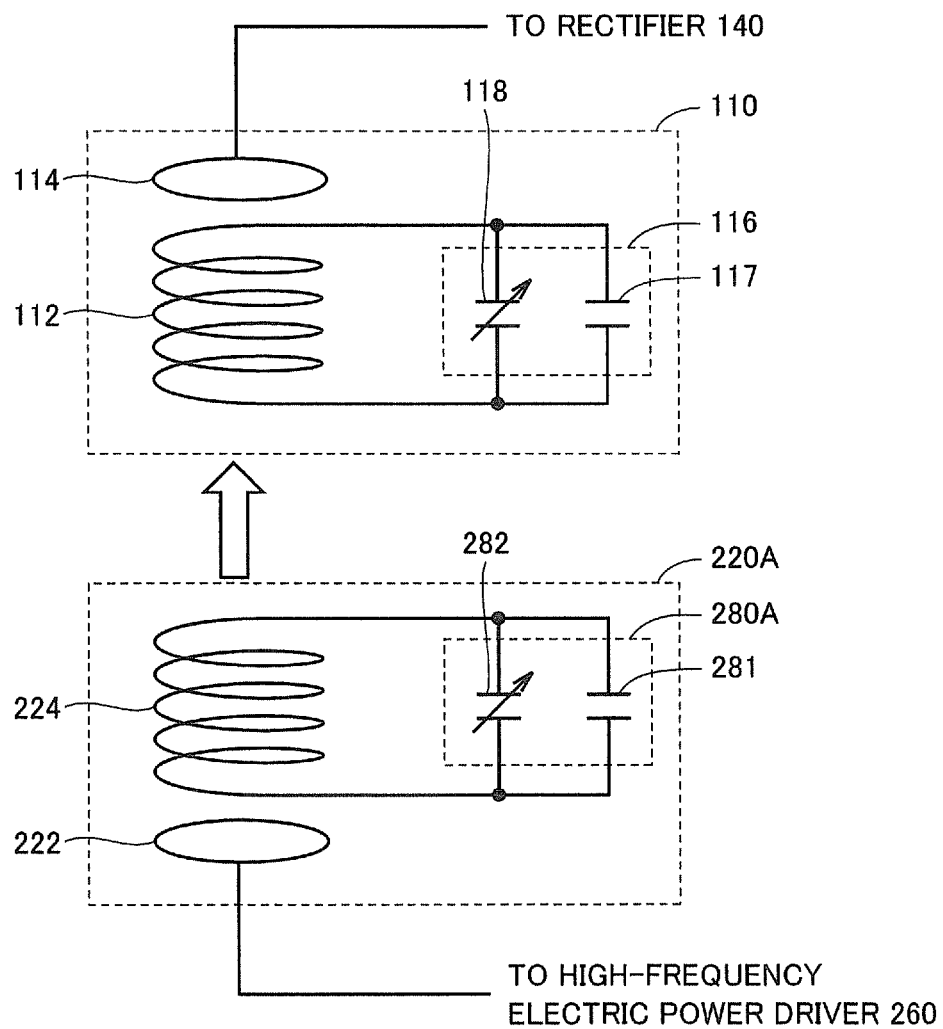
FIG. 21 is a diagram showing an example of each circuit in a power receiving apparatus and a power transmitting unit in the third embodiment.

FIG. 21 is a diagram showing an example of each circuit in power receiving apparatus 110A and power transmitting unit 220A in the third embodiment. As in the first and second embodiments, capacitors 116 and 280A include capacitors 117 and 281, respectively, each having a fixed capacitance and also include capacitors 118 and 282, respectively, each having a variable capacitance.

Figure 22:
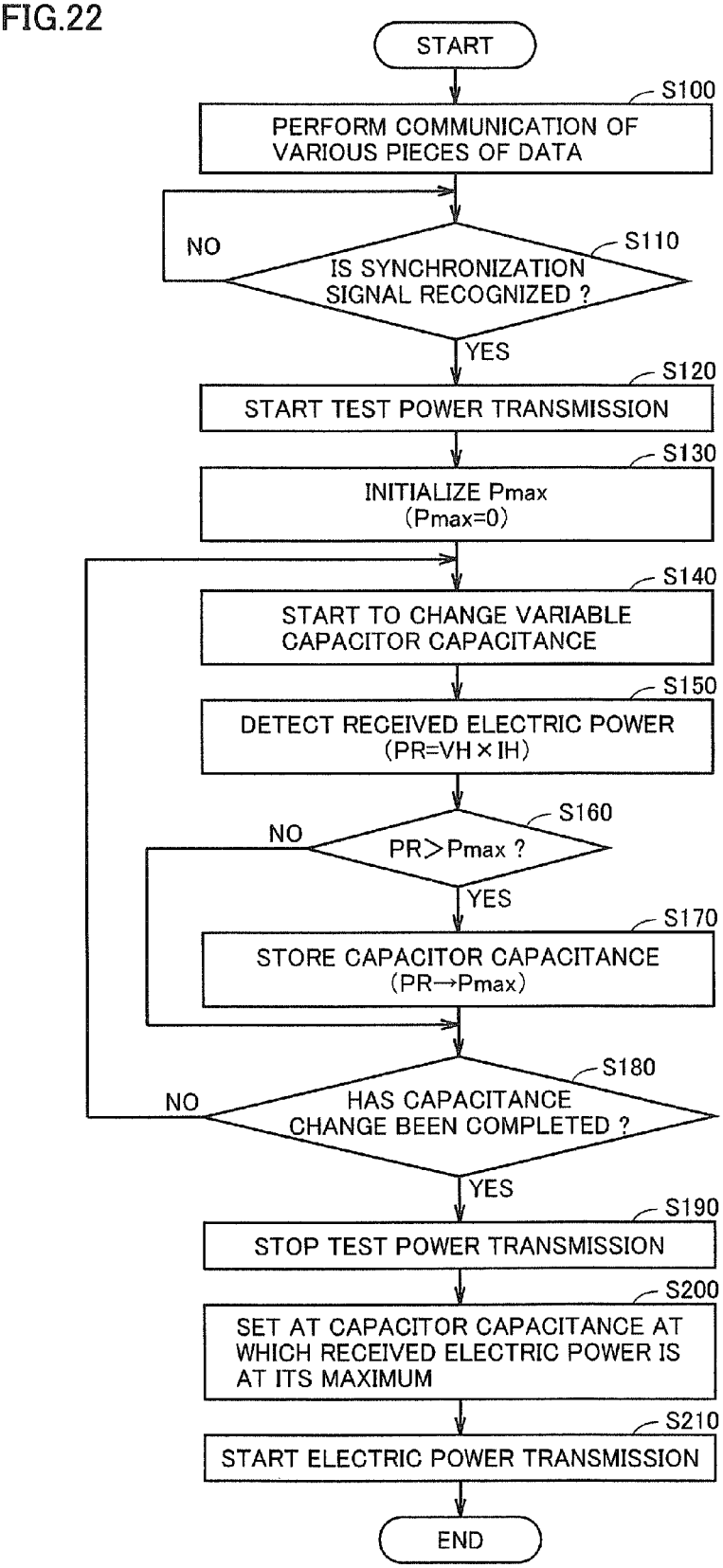
FIG. 22 is a flowchart for illustrating an electric power maximum control process in the third embodiment.

FIG. 22 is a flowchart for illustrating the electric power maximum control process in the third embodiment. Each step in the flowchart shown in FIG. 22 is implemented by executing the program stored in advance in power receiver ECU 185 or power transmitter ECU 270 in predetermined cycles. Alternatively, in some of the steps, the process can be implemented by dedicated hardware (an electronic circuit).

Referring to FIG. 22, when it is detected that vehicle 100 is stopped above power transmitting unit 220, in S100, power receiver ECU 185 and power transmitter ECU 270 transmit and receive various pieces of data of their respective coil units to and from each other via communication units 130 and 240. Various pieces of data of the coil units used herein include a reference resonance frequency of the self-resonant coil, an inductance value of the self-resonant coil, the capacitor's maximum capacitance value, the capacitor's variable capacitance range, and the capacitor's variable adjustment direction (the increasing direction or the decreasing direction).

Then, in S110, power receiver ECU 185 and power transmitter ECU 270 determine whether or not both recognize each other's synchronization signal for control.

When the synchronization signal for control has not been recognized (NO in S110), the process is returned to S110, in which power receiver ECU 185 and power transmitter ECU 270 wait that the synchronization signal is recognized.

When the synchronization signal for control has been recognized (YES in S110), the process proceeds to S120, in which power transmitter ECU 270 starts test power transmission.

Then, in S130, power transmitter ECU 270 initializes memory value Pmax corresponding to the maximum value of the received electric power in the memory unit (not shown) within power transmitter ECU 270 (for example, set at zero).

Then, in S140, power receiver ECU 185 and power transmitter ECU 270 start to change capacitors 116 and 280A, respectively, by control signals CTL1 and CTL2, respectively, in synchronization with each other. In this case, when capacitors 116 and 280A have respective variable ranges identical to each other, the capacitance is changed basically throughout the variable range. On the other hand, when capacitors 116 and 280A have respective variable ranges different from each other, for example, the capacitance may be changed within the range on the relatively narrow variable range side or the capacitance may be changed within the variable ranges overlapping with each other. In any cases, when changing the capacitances of capacitors 116 and 280A, capacitors 116 and 280A each are set in advance at the same capacitance initial value, and thereafter, the capacitances are changed in the identical changing direction (the increasing direction or the decreasing direction) in synchronization with each other.

In S150, power receiver ECU 185 calculates received electric power PR based on the detected values of voltage VH from voltage sensor 190 and current IH from current sensor 195, and then, outputs the calculation result to power transmitter ECU 270.

In S160, power transmitter ECU 270 compares received electric power PR received from power receiver ECU 185 with the stored maximum value Pmax of the received electric power, to determine whether or not received electric power PR is greater than memory value Pmax.

When received electric power PR is greater than memory value Pmax (YES in S160), the process proceeds to S170, in which power transmitter ECU 270 sets the value of received electric power PR as maximum value Pmax of the received electric power, and stores the capacitor capacitance at that time. Then, the process proceeds to S180.

On the other hand, when received electric power PR is not more than memory value Pmax (NO in S160), the process in S170 is skipped and proceeds to S180.

In S180, power transmitter ECU 270 determines whether or not capacitance change of the capacitor has been completed.

When capacitance change of the capacitor has not been completed (NO in S180), the process is returned to S140. Then, power receiver ECU 185 and power transmitter ECU 270 each further change the capacitor capacitance and repeat the process of S150 to S170.

When capacitance change of the capacitor has been completed (YES in S180), power transmitter ECU 270 stops test power transmission in S190.

Then, in S200, power receiver ECU 185 and power transmitter ECU 270 set the capacitances of capacitors 116 and 280A, respectively, to be equal to the capacitor capacitance value at the time when received electric power PR is at its maximum.

Then, in S210, power transmitter ECU 270 starts practical and regular electric power transmission to power receiving apparatus 110.

By the control in accordance with the process as described above, the capacitor capacitance of each of the power receiving apparatus and the power transmitting apparatus can be set so as to maximize the transmission efficiency in the state where the electromagnetic field frequency is maintained at a prescribed frequency. Consequently, in the contactless electric power feeding system using a resonance method, deterioration in the transmission efficiency can be suppressed even when the coil-to-coil distance is changed from the reference distance at the time of design.

In addition, primary self-resonant coil 224 and secondary self-resonant coil 112 in the present embodiment are examples of the "first self-resonant coil" and the "second self-resonant coil", respectively, in the present invention. Power transmitter ECU 270 and power receiver ECU 185 in the present embodiment are examples of the "first controller" and the "second controller", respectively, in the present invention. Furthermore, high-frequency power driver 260 in the present embodiment is an example of the "power supply apparatus" in the present invention.

It should be construed that embodiments disclosed herein are by way of illustration in all respects, not by way of limitation. It is intended that the scope of the present invention is defined by claims, not by the above description of the embodiments, and includes all modifications and variations equivalent in meaning and scope to the claims.

Reference Signs List

10 vehicle power feeding system; 100 vehicle; 110, 110A power receiving apparatus; 112, 340 secondary self-resonant coil; 113 bobbin; 114, 350 secondary coil; 116, 116A, 117, 118, 280, 280A, 281, 282 capacitor; 130, 240 communication unit; 140 rectifier; 142 DC/DC converter; 150 power storage device; 162 voltage step-up converter; 164, 166 inverter; 172, 174 motor generator; 176 engine; 177 power split device; 178 drive wheel; 180 controller; 185 power receiver ECU; 190, 272 voltage sensor; 195, 274 current sensor; 200 power transmitting apparatus; 210 power supply apparatus; 220, 220A power transmitting unit; 222, 320 primary coil; 224, 330 primary self-resonant coil; 250 AC power supply; 260 high-frequency electric power driver; 270 power transmitter ECU; 273 reflected electric power meter; 310 high-frequency power supply; 360 load; 400 power receiving unit; NL ground line; PL1 to PL3 power line; SMR1, SMR2 system main relay.

The invention claimed is:

1. An electric power receiving apparatus for receiving electric power in a contactless manner from an electric power transmitting apparatus, said electric power receiving apparatus comprising:
 a self-resonant coil configured to receive electric power in a contactless manner from said electric power transmitting apparatus;
 a variable capacitor connected to said self-resonant coil and having a capacitance variable within a prescribed variable range;
 a capacitor connected in parallel to said variable capacitor and having a fixed capacitance; and
 a controller for controlling the capacitance of said variable capacitor, wherein
 said variable capacitor is designed such that a capacitance value obtained by subtracting a half capacitance of said variable range of said variable capacitor from a total capacitance of the capacitance of said capacitor and a maximum capacitance of said variable capacitor is smaller than the capacitance of said variable capacitor at a time when said electric power transmitting apparatus and said electric power receiving apparatus have respective resonance frequencies approximately identical to each other.

2. The electric power receiving apparatus according to claim 1, wherein said capacitor is greater in capacitance than said variable capacitor.

3. The electric power receiving apparatus according to claim 1, wherein said controller searches for a capacitance at which received electric power received from said electric power transmitting apparatus is at its maximum while changing the capacitance of said variable capacitor, and adjusts the capacitance of said variable capacitor at a capacitance at which said received electric power searched is at its maximum.

4. The electric power receiving apparatus according to claim 3, wherein said controller searches for the capacitance at which the received electric power received from said electric power transmitting apparatus is at its maximum while changing the capacitance of said variable capacitor by a prescribed changing amount.

5. The electric power receiving apparatus according to claim 3, wherein said controller searches for the capacitance at which the received electric power received from said electric power transmitting apparatus is at its maximum by detecting the received electric power for each capacitance value throughout said variable range of said variable capacitor.

6. The electric power receiving apparatus according to claim 3, wherein said controller searches for the capacitance at which the received electric power received from said electric power transmitting apparatus is at its maximum by detecting the received electric power while changing the capacitance of said variable capacitor from a minimum capacitance to a maximum capacitance of said variable capacitor.

7. An electric power transmitting apparatus for transmitting electric power in a contactless manner to an electric power receiving apparatus, said electric power transmitting apparatus comprising:
 a self-resonant coil configured to transmit electric power supplied from a power supply apparatus in a contactless manner to said electric power receiving apparatus;
 a variable capacitor connected to said self-resonant coil and having a capacitance variable within a prescribed variable range;
 a capacitor connected in parallel to said variable capacitor and having a fixed capacitance; and
 a controller for controlling the capacitance of said variable capacitor, wherein
 said variable capacitor is designed such that a capacitance value obtained by subtracting a half capacitance of said variable range of said variable capacitor from a total capacitance of the capacitance of said capacitor and a maximum capacitance of said variable capacitor is smaller than the capacitance of said variable capacitor at a time when said electric power transmitting apparatus and said electric power receiving apparatus have respective resonance frequencies approximately identical to each other.

8. The electric power transmitting apparatus according to claim 7, wherein said capacitor is greater in capacitance than said variable capacitor.

9. The electric power transmitting apparatus according to claim 7, wherein said controller searches for a capacitance at which reflected electric power reflected by said electric power receiving apparatus is at its minimum while changing the capacitance of said variable capacitor, and adjusts the capacitance of said variable capacitor at a capacitance at which said reflected electric power searched is at its minimum.

10. The electric power transmitting apparatus according to claim 9, wherein said controller searches for the capacitance at which the reflected electric power reflected by said electric power receiving apparatus is at its minimum while changing the capacitance of said variable capacitor by a prescribed changing amount.

11. The electric power transmitting apparatus according to claim 9, wherein said controller searches for the capacitance at which the reflected electric power reflected by said electric power receiving apparatus is at its minimum by detecting the reflected electric power for each capacitance value throughout said variable range of said variable capacitor.

12. The electric power transmitting apparatus according to claim 9, wherein said controller searches for the capacitance at which the reflected electric power reflected by said electric power receiving apparatus is at its minimum by detecting the reflected electric power while changing the capacitance of said variable capacitor from a minimum capacitance to a maximum capacitance of said variable capacitor.

* * * * *